(12) United States Patent
Suzumura et al.

(10) Patent No.: US 8,503,911 B2
(45) Date of Patent: Aug. 6, 2013

(54) CHARGING MEMBER AND METHOD OF PRODUCING THE MEMBER, PROCESS CARTRIDGE, AND ELECTROPHOTOGRAPHIC IMAGE-FORMING APPARATUS

(75) Inventors: Noriko Suzumura, Mishima (JP);
Noriaki Kuroda, Suntou-gun (JP);
Masataka Kodama, Mishima (JP);
Yuya Tomomizu, Suntou-gun (JP);
Hiroki Masu, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/615,369

(22) Filed: Sep. 13, 2012

(65) Prior Publication Data

US 2013/0064574 A1   Mar. 14, 2013

Related U.S. Application Data

(63) Continuation of application No. PCT/JP2012/002627, filed on Apr. 16, 2012.

(30) Foreign Application Priority Data

Apr. 27, 2011   (JP) ................................. 2011-099828

(51) Int. Cl.
*G03G 15/02* (2006.01)
(52) U.S. Cl.
USPC ......................................... 399/176; 399/168
(58) Field of Classification Search
USPC ................................. 399/168, 176
See application file for complete search history.

(56) References Cited

U.S. PATENT DOCUMENTS

| 5,270,768 | A | | 12/1993 | Murata |
| 5,619,311 | A | * | 4/1997 | Kurokawa et al. ............. 399/176 |
| 5,790,927 | A | * | 8/1998 | Ando et al. .................... 399/176 |
| 6,625,416 | B1 | | 9/2003 | Badesha et al. |
| 6,909,859 | B2 | * | 6/2005 | Nakamura et al. ........ 399/176 X |

(Continued)

FOREIGN PATENT DOCUMENTS

| JP | 5-150617 A | 6/1993 |
| JP | 2002-174963 A | 6/2002 |

(Continued)

OTHER PUBLICATIONS

PCT International Search Report in International Application No. PCT/JP2012/002627, Mailing Date May 29, 2012.

(Continued)

*Primary Examiner* — Sandra Brase
(74) *Attorney, Agent, or Firm* — Fitzpatrick, Cella, Harper & Scinto

(57) ABSTRACT

Provided are the following charging member and a method of producing the charging member. The charging member has an improved charging ability and hence alleviates, in particular, a positive ghost. The charging member can maintain resistance to the adhesion of toner, a toner external additive, or the like over a long time period. The charging member for an electrophotographic apparatus comprises an electro-conductive support, an electro-conductive elastic layer, and a surface layer, wherein the surface layer comprises a polymer compound having an Si—O—Ti linkage in a molecular structure thereof, and the polymer compound has each of constitutional units represented by a formula (1), a formula (2), and a formula (3) defined in the description. The method is a method of producing the charging member.

9 Claims, 4 Drawing Sheets

U.S. PATENT DOCUMENTS

| | | | |
|---|---|---|---|
| 7,072,604 B2 * | 7/2006 | Miura et al. | 399/176 |
| 7,664,434 B2 | 2/2010 | Kuroda et al. | |
| 7,693,457 B2 | 4/2010 | Kuruma et al. | |
| 7,715,737 B2 * | 5/2010 | Yamaura et al. | 399/176 X |
| 7,962,068 B2 | 6/2011 | Kuroda et al. | |
| 8,064,803 B2 | 11/2011 | Kuroda et al. | |
| 8,092,358 B2 | 1/2012 | Kuruma et al. | |
| 8,227,087 B2 | 7/2012 | Mayuzumi et al. | |
| 8,277,947 B2 | 10/2012 | Mayuzumi et al. | |
| 2011/0182618 A1 | 7/2011 | Kuruma et al. | |
| 2011/0217072 A1 | 9/2011 | Kuroda et al. | |
| 2012/0076535 A1 | 3/2012 | Nagamine et al. | |
| 2012/0082481 A1 | 4/2012 | Nagamine et al. | |
| 2012/0093539 A1 | 4/2012 | Nagamine et al. | |
| 2012/0107565 A1 | 5/2012 | Kuroda et al. | |
| 2012/0121296 A1 | 5/2012 | Kuroda et al. | |
| 2012/0134709 A1 | 5/2012 | Kuroda et al. | |
| 2012/0141159 A1 | 6/2012 | Nagamine et al. | |
| 2012/0141160 A1 | 6/2012 | Tomomizu et al. | |
| 2012/0141162 A1 | 6/2012 | Mayuzumi et al. | |
| 2012/0288301 A1 | 11/2012 | Taniguchi et al. | |
| 2012/0301180 A1 | 11/2012 | Tomomizu et al. | |
| 2013/0004206 A1 | 1/2013 | Kuroda et al. | |

FOREIGN PATENT DOCUMENTS

| | | |
|---|---|---|
| JP | 2007-4102 A | 1/2007 |
| JP | 2008-299255 A | 12/2008 |
| JP | 2009-58634 A | 3/2009 |
| JP | 2011-137109 A | 7/2011 |

OTHER PUBLICATIONS

PCT International Search Report and Written Opinion of the International Searching Authority, International Application No. PCT/JP2012/002627, Mailing Date May 29, 2012.

Kodama, et al., U.S. Appl. No. 13/615,403, filed Sep. 13, 2012.

Masu, et al., U.S. Appl. No. 13/649,928, filed Oct. 11, 2012.

* cited by examiner

CHARGING MEMBER AND METHOD OF PRODUCING THE MEMBER, PROCESS CARTRIDGE, AND ELECTROPHOTOGRAPHIC IMAGE-FORMING APPARATUS

CROSS-REFERENCE TO RELATED APPLICATIONS

This application is a continuation of International Application No. PCT/JP2012/002627, filed Apr. 16, 2012, which claims the benefit of Japanese Patent Application No. 2011-099828, filed Apr. 27, 2011.

BACKGROUND OF THE INVENTION

1. Field of the Invention

The present invention relates to a charging member to be used in an electrophotographic apparatus and a method of producing the charging member, a process cartridge, and an electrophotographic image-forming apparatus.

2. Description of the Related Art

A charging member that abuts on an electrophotographic photosensitive member to charge the electrophotographic photosensitive member is generally formed so as to have a rubber-containing elastic layer in order that an abutment nip between the electrophotographic photosensitive member and the charging member may be sufficiently and uniformly secured.

In recent years, an additional improvement in durability has started to be required for an electrophotographic image-forming apparatus. To realize the improvement, its charging member has been demanded to exert stable charging performance over a long time period. Japanese Patent Application Laid-Open No. 2007-004102 proposes, as a charging member suppressing the fixation of toner or an external additive to its surface even after its long-term, repeated use, and showing stable charging performance over a long time period, a charging member including a surface layer containing a polysiloxane having an alkyl fluoride group and an oxyalkylene group. Meanwhile, in association with an increase in process speed of an electrophotographic image-forming apparatus in recent years, the time period for which its electrophotographic photosensitive member and charging member contact each other has started to become relatively short. The foregoing is disadvantageous to stably and reliably charge the electrophotographic photosensitive member. Specifically, as disclosed in Japanese Patent Application Laid-Open No. 2008-299255, it is said that the charging uniformity of the photosensitive member reduces, and in particular, a suppressing effect on a positive ghost reduces.

The positive ghost can be eliminated by removing residual charge on the photosensitive member after a transferring step through the performance of the so-called pre-exposure on the photosensitive member before the primary charging of the photosensitive member by the charging member. However, the introduction of pre-exposing unit into the electrophotographic image-forming apparatus is disadvantageous for a reduction in size of the electrophotographic image-forming apparatus. Accordingly, it can be said that the problem is preferably solved by improving the charging ability of the charging member itself.

SUMMARY OF THE INVENTION

As a result of an investigation conducted on the charging member according to Japanese Patent Application Laid-Open No. 2007-004102 by the inventors of the present invention, the inventors have acknowledged that although a suppressing effect on the adhesion of toner or the like to the surface of the charging member is certainly observed, an additional technological development is needed in order that a photosensitive member may be uniformly charged in a stable fashion even at a high process speed.

In view of the foregoing, the present invention is directed to providing a charging member capable of maintaining, over a long time period, a high charging ability by which a photosensitive member can be stably charged even at a high process speed, and a method of producing the charging member.
Further, the present invention is directed to providing an electrophotographic apparatus and a process cartridge capable of stably forming high-quality electrophotographic images.

According to one aspect of the present invention, there is provided a charging member for an electrophotographic apparatus, comprising: an electro-conductive support; an electro-conductive elastic layer; and a surface layer, wherein: the surface layer comprises a polymer compound having an Si—O—Ti linkage in a molecular structure thereof; and the polymer compound has constitutional units represented by the following formulae (1), (2), and (3):

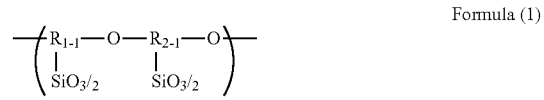

Formula (1)

Formula (2)

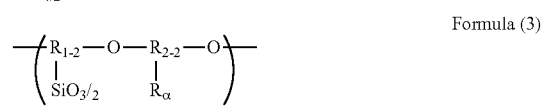

Formula (3)

in the formulae (1) and (3), $R_{1-1}$, $R_{2-1}$, $R_{1-2}$, and $R_{2-2}$ each independently represent any one of structures represented by the following formulae (4) to (7), and in the formula (3), $R\alpha$ represents any one of structures represented by the following formulae (8) to (12):

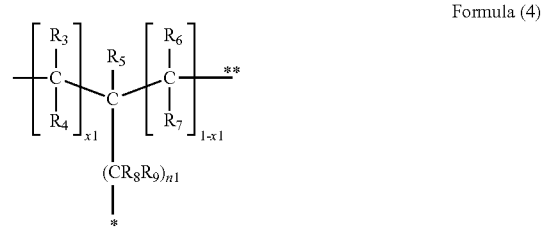

Formula (4)

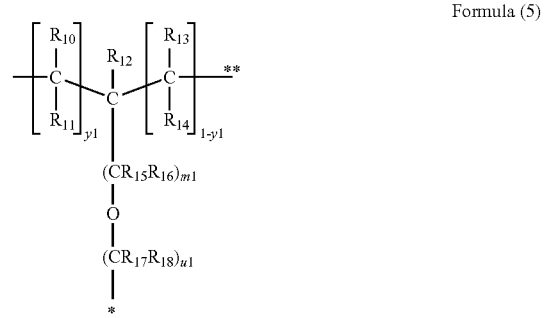

Formula (5)

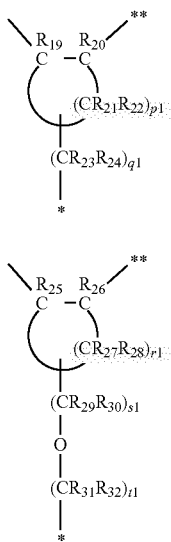

Formula (6)

Formula (7)

in the formulae (4) to (7):

$R_3$ to $R_7$, $R_{10}$ to $R_{14}$, $R_{19}$, $R_{20}$, $R_{25}$, and $R_{26}$ each independently represent a hydrogen atom, an alkyl group having 1 or more and 4 or less carbon atoms, a hydroxyl group, a carboxyl group, or an amino group;

$R_8$, $R_9$, $R_{15}$ to $R_{18}$, $R_{23}$, $R_{24}$, and $R_{29}$ to $R_{32}$ each independently represent a hydrogen atom, or an alkyl group having 1 or more and 4 or less carbon atoms, and $R_{21}$, $R_{22}$, $R_{27}$, and $R_{28}$ each independently represent a hydrogen atom, an alkoxy group having 1 or more and 4 or less carbon atoms, or an alkyl group having 1 or more and 4 or less carbon atoms; n1, m1, q1, s1, t1, and u1 each independently represent an integer of 1 or more and 8 or less, and p1 and r1 each independently represent an integer of 4 or more and 12 or less;

x1 and y1 each independently represent 0 or 1;

a symbol "*" represents a site to be bonded to a silicon atom in the formula (1), a site to be bonded to a silicon atom in the formula (3), or a site to be bonded to any one of the structures represented by the following formulae (8) to (12) as Rα in the formula (3); and a symbol "**" represents a site to be bonded to an oxygen atom in each of the formula (1) and the formula (3):

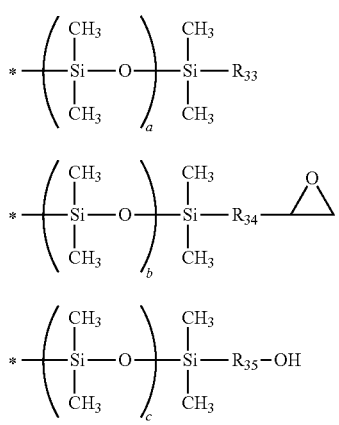

Formula (8)

Formula (9)

Formula (10)

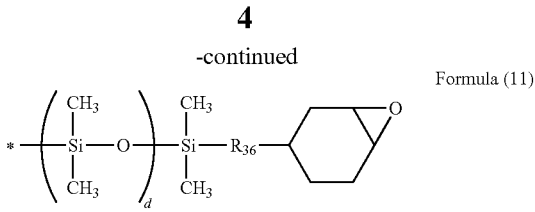

Formula (11)

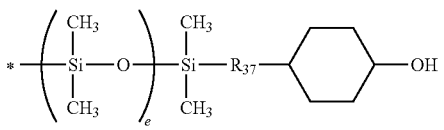

Formula (12)

in the formulae (8) to (12):

$R_{33}$ to $R_{37}$ each independently represent an alkylene group having 1 or more and 6 or less carbon atoms, or a hydrocarbon group partially substituted with an ether group;

a to e each independently represent an integer of 1 or more and 1,350 or less; and a symbol "*" represents a site to be bonded to the symbol "*" in any one of the structures represented by the formulae (4) to (7) as $R_{2-2}$ in the formula (3).

According to another aspect of the present invention, there is provided an electrophotographic apparatus, comprising: an electrophotographic photosensitive member; and the above-described charging member placed to contact the electrophotographic photosensitive member. According to further aspect of the present invention, there is provided a process cartridge, comprising: an electrophotographic photosensitive member; and the above-described charging member placed to contact the electrophotographic photosensitive member, wherein the process cartridge is detachably mountable to a main body of an electrophotographic apparatus.

According to the present invention, there is provided the charging member excellent in charging performance and whose charging performance hardly changes over time can be obtained. In addition, according to the present invention, provided are the electrophotographic apparatus and the process cartridge capable of stably forming high-quality electrophotographic images can be obtained.

Further features of the present invention will become apparent from the following description of exemplary embodiments with reference to the attached drawings.

DESCRIPTION OF THE EMBODIMENTS

A charging member according to the present invention includes a surface layer containing a polysiloxane containing a titanium atom in a molecule thereof and having a dimethyl silicone oil grafted thereto. The charging member having such surface layer shows a high charging ability by virtue of the presence of a titanium atom in the surface layer. In addition, the adhesion of toner and an external additive to the surface of the charging member is suppressed over a long time period by virtue of the presence of the dimethyl silicone oil grafted to the polysiloxane.

Accordingly, the charging member according to the present invention can maintain a high charging ability over a long time period. In addition, even in the case of an electrophotographic apparatus having a high process speed, the application of the charging member according to the present invention suppresses the occurrence of a positive ghost in an electrophotographic image without the use of any pre-exposing units, thereby enabling the apparatus to stably form high-quality electrophotographic images over a long time period.

Figure 1:
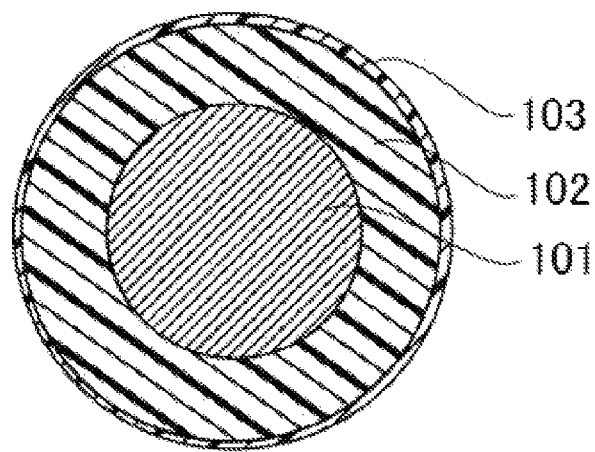
FIG. 1 is a view illustrating an example of the construction of a charging member of the present invention.

The charging member according to the present invention has an electro-conductive support, an electro-conductive elastic layer formed on the support, and a surface layer formed on the electro-conductive elastic layer. FIG. 1 illustrates an example of the construction of the charging member of the present invention. In FIG. 1, reference numeral 101 represents the electro-conductive support, reference numeral 102 represents the electro-conductive elastic layer, and reference numeral 103 represents the surface layer.

(Support)

The support of the charging member has only to be an electro-conductive support having electro-conductivity, and for example, a support (e.g. columnar metal) made of a metal (alloy) such as iron, copper, stainless steel, aluminum, an aluminum alloy, or nickel can be used.

(Electro-Conductive Elastic Layer)

The elastic layer (electro-conductive elastic layer) of a conventional charging member can be used as the electro-conductive elastic layer. The electro-conductive elastic layer can be produced by using, for example, one or two or more kinds of elastomers such as a rubber and a thermoplastic elastomer to be described later, and an electro-conductive agent. Examples of the rubber include a urethane rubber, a silicone rubber, a butadiene rubber, an isoprene rubber, a chloroprene rubber, a styrene-butadiene rubber, an ethylene-propylene rubber, a polynorbornene rubber, a styrene-butadiene-styrene rubber, an acrylonitrile rubber, an epichlorohydrin rubber, and an alkyl ether rubber.

Examples of the thermoplastic elastomer include a styrene-based elastomer and an olefin-based elastomer. As commercially available products of the styrene-based elastomer, there are given, for example, a product available under the trade name "Rabalon" from Mitsubishi Chemical Corporation and a product available under the trade name "SEPTON compound" from Kuraray Co., Ltd. As commercially available products of the olefin-based elastomer, there are given, for example, a product available under the trade name "Thermolan" from Mitsubishi Chemical Corporation, a product available under the trade name "Milastomer" from Mitsui Petrochemical Industries, Ltd., a product available under the trade name "Sumitomo TPE" from Sumitomo Chemical Industry Co., Ltd., and a product available under the trade name "Santoprene" from Advanced Elastomer Systems Co., Ltd.

In addition, the electro-conductivity of the electro-conductive elastic layer can be adjusted to a predetermined value by appropriately using an electro-conductive agent. The electrical resistance of the electro-conductive elastic layer can be adjusted by appropriately selecting the kind and usage of the electro-conductive agent. In order to attain a charge amount required for obtaining a good quality image without charge leakage to a drum, the electrical resistance suitably falls within the range of $10^2 \Omega$ or more and $10^8 \Omega$ or less, more suitably falls within the range of $10^3 \Omega$ or more and $10^6 \Omega$ or less.

Examples of the electro-conductive agent to be used in the electro-conductive elastic layer include a cationic surfactant, an anionic surfactant, a zwitterionic surfactant, an antistatic agent, and an electrolyte.

Further, electro-conductive carbon such as Ketjen Black EC, acetylene black, carbon for rubber, carbon for (color) ink subjected to oxidation treatment, and pyrolytic carbon can be used as the electro-conductive agent for the electro-conductive elastic layer. Further, graphite such as natural graphite and artificial graphite can be used as the electro-conductive agent for the electro-conductive elastic layer. Further, metal oxides such as tin oxide, titanium oxide, and zinc oxide, metals such as nickel, copper, silver, and germanium, and electro-conductive polymers such as a polyaniline, a polypyrrole, and a polyacetylene can each be used as the electro-conductive agent for the electro-conductive elastic layer.

In addition, an inorganic or organic filler, or a crosslinking agent may be added to the electro-conductive elastic layer. Examples of the filler include silica (white carbon), calcium carbonate, magnesium carbonate, clay, talc, zeolite, alumina, barium sulfate, and aluminum sulfate. Examples of the crosslinking agent include sulfur, a peroxide, a crosslinking aid, a crosslinking accelerator, a crosslinking supplement accelerator, and a crosslinking retarder.

In addition, the electro-conductive elastic layer is preferably of the so-called crown shape in which a thickness at its central portion is larger than a thickness at each of its end portions.

(Surface Layer)

The surface layer contains a polymer compound having an Si—O—Ti linkage in its molecular structure (hereinafter, sometimes simply referred to as "polymer compound"), and the polymer compound has constitutional units represented by the following formulae (1), (2), and (3).

It should be noted that the fact that the polymer compound has an Si—O—Ti linkage in its molecular structure means that Si and Ti are bonded to each other at a molecular level. Accordingly, the surface layer tends to be a uniform film where no phase separation occurs, and when used in the charging member, the surface layer has charging uniformity.

The constitutional unit represented by the formula (1) in the polymer compound contributes to an improvement in adhesiveness between the surface layer and the electro-conductive elastic layer.

In addition, the constitutional unit represented by the formula (2) contributes to an improvement in charging ability. It should be noted that the formula "$TiO_{4/2}$" means that Ti has four bonds to other atoms (Si and Ti) through O. Further, the constitutional unit represented by the formula (3) contributes to the expression of such an effect that the adhesion of toner, an external additive, or the like to the surface of the charging member is suppressed over a long time period.

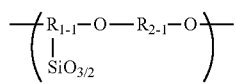
Formula (1)

Formula (2)
TiO$_{4/2}$

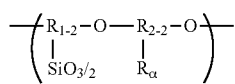
Formula (3)

In the formulae (1) and (3), $R_{1-1}$, $R_{2-1}$, $R_{1-2}$, and $R_{2-2}$ each independently represent any one of the structures represented by the following formulae (4) to (7).

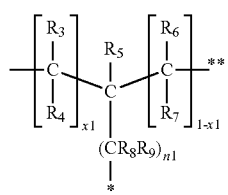
Formula (4)

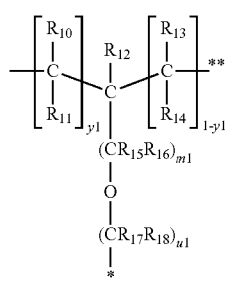
Formula (5)

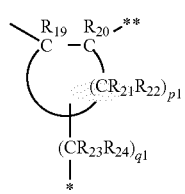
Formula (6)

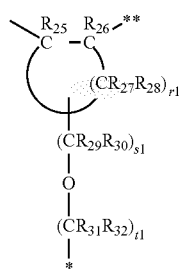
Formula (7)

In the formulae (4) to (7), $R_3$ to $R_7$, $R_{10}$ to $R_{14}$, $R_{19}$, $R_{20}$, $R_{25}$, and $R_{26}$ each independently represent a hydrogen atom, an alkyl group having 1 or more and 4 or less carbon atoms, a hydroxyl group, a carboxyl group, or an amino group. $R_8$, $R_9$, $R_{15}$ to $R_{18}$, $R_{23}$, $R_{24}$, and $R_{29}$ to $R_{32}$ each independently represent a hydrogen atom or an alkyl group having 1 or more and 4 or less carbon atoms. $R_{21}$, $R_{22}$, $R_{27}$, and $R_{28}$ each independently represent a hydrogen atom, an alkoxy group having 1 or more and 4 or less carbon atoms, or an alkyl group having 1 or more and 4 or less carbon atoms. n1, m1, q1, s1, t1, and u1 each independently represent an integer of 1 or more and 8 or less. p1 and r1 each independently represent an integer of 4 or more and 12 or less. x1 and y1 each independently represent 0 or 1. In addition, a symbol "*" represents a site to be bonded to a silicon atom in the formula (1), a site to be bonded to a silicon atom in the formula (3), or a site to be bonded to any one of the structures represented by the following formulae (8) to (12) as Rα in the formula (3). A symbol "**" represents a site to be bonded to an oxygen atom in each of the formula (1) and the formula (3).

Shown below is an example of part of the structure of the polymer compound to be used in the present invention when $R_{1-1}$ in the formula (1) represents a structure represented by the formula (4) and $R_{2-1}$ therein represents a structure represented by the formula (5).

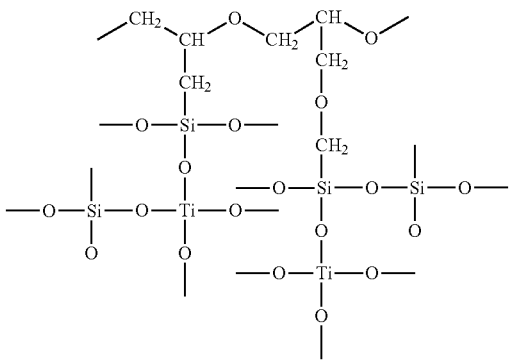

Further, shown below is an example of part of the structure of the polymer compound to be used in the present invention when $R_{1-1}$ in the formula (1) represents a structure represented by the formula (4) and $R_{2-1}$ therein represents a structure represented by the formula (7).

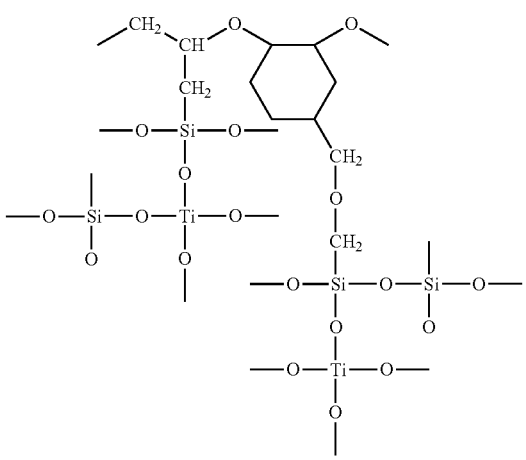

Rα is a side chain including dimethylsiloxane as a main component and represents any one of the structures represented by the following formulae (8) to (12).

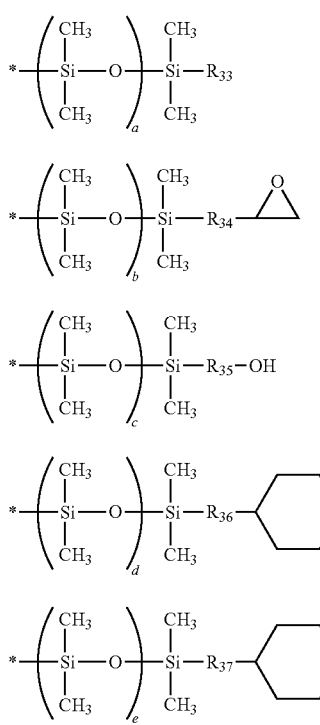

Formula (8)

Formula (9)

Formula (10)

Formula (11)

Formula (12)

$R_{33}$ to $R_{37}$ each independently represent an alkylene group having 1 or more and 6 or less carbon atoms, or a hydrocarbon group partially substituted with an ether group, and a to e each independently represent an integer of 1 or more and 1,350 or less. In the formulae (8) to (12), a symbol "*" represents a site to be bonded to the symbol "*" in any one of the structures represented by the formulae (4) to (7) as $R_{2-2}$ in the formula (3).

Shown below is an example of part of the structure of the polymer compound to be used in the present invention when each of $R_{1-2}$ and $R_{2-2}$ in the formula (3) represents a structure represented by the formula (4), and Rα therein represents a structure represented by the formula (8). It should be noted that n (the number of repeating units) in the following structure represents an integer of 1 or more and 1,350 or less.

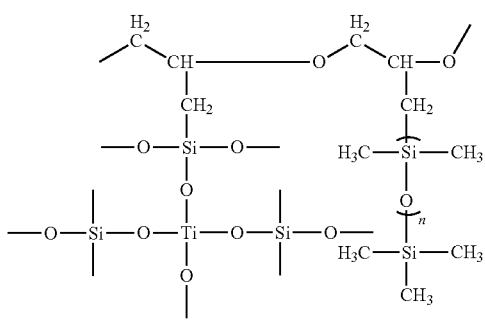

In the polymer compound, it is preferred that $R_{1-1}$, $R_{2-1}$, $R_{1-2}$, and $R_{2-2}$ in the formulae (1) and (3) each independently represent any one of the structures represented by the following formulae (13) to (16). With such structure, the surface layer can be additionally tough and excellent in durability. In particular, a structure containing an ether group represented by each of the following formulae (14) and (16) can additionally improve the adhesiveness of the surface layer for the elastic body.

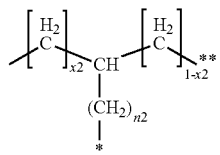

Formula (13)

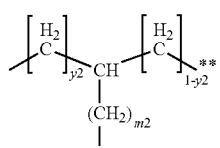

Formula (14)

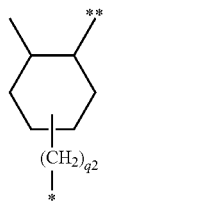

Formula (15)

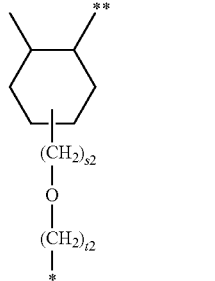

Formula (16)

In the formulae (13) to (16), n2, m2, q2, s2, t2, and u2 each independently represent an integer of 1 or more and 8 or less, and x2 and y2 each independently represent 0 or 1.

A ratio (Ti/Si) of the number of titanium atoms to the number of silicon atoms in the polymer compound is preferably 0.1 or more and 12.5 or less, particularly preferably 1.0 or more and 10.0 or less. This is because such ratio is conducive to an additional improvement in charging ability of the charging member according to the present invention.

The surface layer can contain a urethane resin, a fluorine-based resin, a silicone resin, an acrylic resin, a polyamide resin, or the like in addition to the polymer compound. It should be noted that the content of the polymer compound in the surface layer is preferably 10 mass % or more from the viewpoint of improving the charging ability.

The elastic modulus of the surface layer is preferably 2,000 MPa or less in order that the electro-conductive elastic layer provided for sufficiently securing an abutting nip with an electrophotographic photosensitive member may be caused to sufficiently exert its function. On the other hand, lowering the elastic modulus of the layer generally tends to reduce its crosslink density. Accordingly, the elastic modulus of the surface layer is preferably 100 MPa or more from the viewpoint of suppressing the bleeding of a low-molecular weight component from the elastic layer toward the surface of the charging member.

In addition, as the thickness of the surface layer increases, a suppressing effect on the bleedout of the low-molecular weight component tends to enlarge. At the same time, however, the charging ability of the charging member tends to reduce. Therefore, the thickness of the surface layer is preferably 0.005 μm or more and 1.000 μm or less, particularly preferably 0.010 μm or more and 0.600 μm or less.

The thickness of the surface layer can be determined by: shaving a surface site of the charging member with a razor; immersing the site in liquid nitrogen to rupture the site; and observing its section after the rupture with a scanning electron microscope (SEM) (manufactured by JEOL Ltd.) at a magnification of about 20,000.

In addition, the surface of the charging member (the surface of the surface layer) has a roughness (Rz) in conformity with JIS B0601:1994 of preferably 10 μm or less, particularly preferably 7 μm or less, more preferably 3 μm or more and 5 μm or less from the viewpoint of suppressing the fixation of toner or an external additive to the surface of the charging member.

The charging member preferably has a surface free energy of 30 mJ/m² or less. As long as the surface free energy is 30 mJ/m² or less, the charging member has a low affinity for an attached matter such as toner or an external additive. Accordingly, even when the attached matter exists near the surface of the charging member, the attached matter hardly fixes to the surface of the charging member. The surface free energy can be measured with a contact angle meter CA-X RALL type manufactured by Kyowa Interface Science Co., Ltd. In addition, the Kitazaki-Hata theory can be employed in the analysis of the surface free energy, and the surface free energy ($\gamma^{total}$) is calculated from the following calculation equation (1).

$$\gamma^{total} = \gamma^d + \gamma^p + \gamma^h \quad \text{Calculation equation (1)}$$

The coefficient of dynamic friction of the surface layer of the charging member is preferably 0.1 or more and 0.3 or less in measurement with respect to a polyethylene telephthalate (PET) sheet. Setting the coefficient of dynamic friction within the range can suppress, in an additionally reliable fashion, the occurrence of a slip when the charging member is rotated in association with the rotation of the photosensitive member, thereby enabling additionally stable charging of the photosensitive member.

Figure 3:
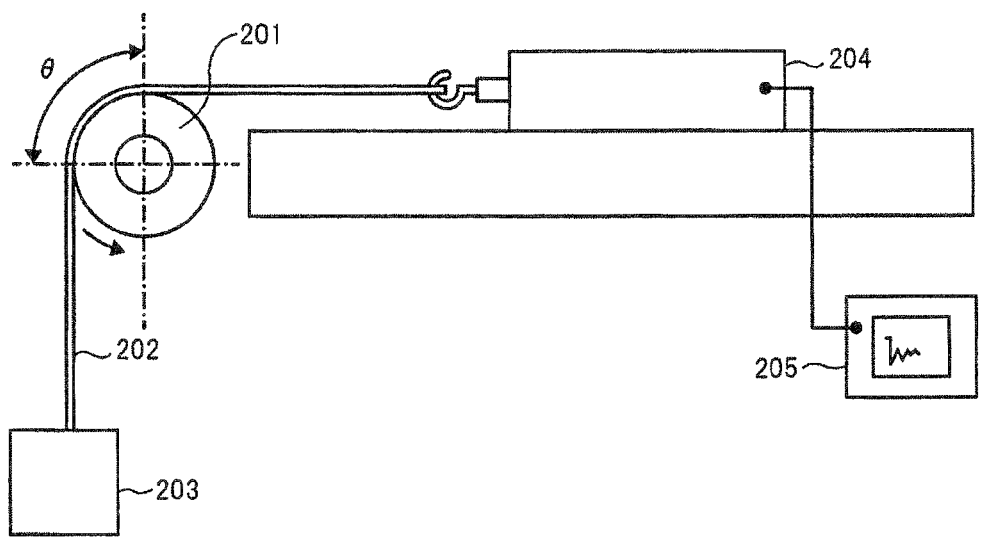
FIG. 3 is a view illustrating an apparatus for measuring a coefficient of dynamic friction.

FIG. 3 illustrates an apparatus for measuring a coefficient of dynamic friction. In FIG. 3, a charging member 201 as a measuring object contacts a belt 202 at a predetermined angle θ. A dead weight 203 is connected to one end of the belt 202 and a load meter 204 is connected to the other end thereof. In addition, a recorder 205 is connected to the load meter 204. It should be noted that a belt made of a PET (trade name: Lumirror S10 #100, manufactured by Toray Industries, Inc.) having a thickness of 100 μm, a width of 30 mm, and a length of 180 mm was used as the belt 202 in each of examples to be described later.

When the charging member 201 is rotated in a predetermined direction and at a predetermined speed in a state illustrated in FIG. 3, its coefficient of friction is determined from the following calculation equation (2) where F represents a force [N] measured with the load meter 204, and W represents the sum [N] of the weight of the dead weight and the weight of the belt. It should be noted that the measurement method is in conformity with Euler's belt formula.

$$\text{Coefficient of friction} = (1/\theta)\ln(F/W) \quad \text{Calculation equation (2)}$$

In each of the examples to be described later, W was set to 0.98 [N] (100 gw), the rotational speed of the charging member was set to 115 rpm, and the measurement was performed under an environment having a temperature of 23° C. and a relative humidity of 50% RH.

(Production of Polymer Compound)

The polymer compound according to the present invention can be synthesized by causing a hydrolyzed condensate of a hydrolyzable compound represented by the following formula (17) and a hydrolyzable compound represented by the following formula (18), and at least one of epoxy-modified silicone oils represented by the following formulae (23) to (25) to react with each other. It should be noted that the epoxy-modified silicone oils represented by the formulae (23) to (25) are hereinafter sometimes simply referred to as "silicone oils."

The hydrolyzed condensate and the silicone oil can be bonded to each other by subjecting a cationically polymerizable group represented by $R_{38}$ in the hydrolyzable compound according to the formula (17), e.g., an epoxy group and an epoxy group of the silicone oil to a ring-opening reaction in the presence of a cationic polymerization catalyst.

Here, it is preferred that the ring-opening reaction be caused by ultraviolet irradiation because a reaction time can be shortened as compared with that in the case where the reaction is caused with heat and because the heat deterioration of the elastic layer can be suppressed.

$$R_{38}-Si(OR_{39})(OR_{40})(OR_{41}) \quad \text{Formula (17)}$$

In the formula (17), $R_{39}$ to $R_{41}$ each independently represents a hydrocarbon group. In addition, each of $R_{39}$ to $R_{41}$ preferably represents a hydrocarbon group having 1 or more and 4 or less carbon atoms from the viewpoint of the rate of the reaction. Specifically, each of $R_{39}$ to $R_{41}$ more preferably represents a methyl group, an ethyl group, an n-propyl group, an i-propyl group, an n-butyl group, or a t-butyl group. $R_{38}$ represents a cationically polymerizable group. Examples of the cationically polymerizable group include cyclic ether groups such as an epoxy group and an oxetane group, and a vinyl ether group. Of those, an epoxy group is preferred from the viewpoints of ease of availability and ease with which the reaction is controlled. Further, in the formula (17), $R_{38}$ more preferably represents any structure selected from the group consisting of structures represented by formulae (19) to (22), the structure having an epoxy group.

Formula (19)

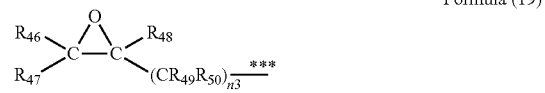

Formula (20)

Formula (21)

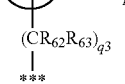

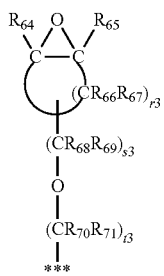

Formula (22)

In the formulae (19) to (22), $R_{46}$ to $R_{48}$, $R_{51}$ to $R_{53}$, $R_{58}$, $R_{59}$, $R_{64}$, and $R_{65}$ each independently represent a hydrogen atom, an alkyl group having 1 or more and 4 or less carbon atoms, a hydroxyl group, a carboxyl group, or an amino group. $R_{49}$, $R_{50}$, $R_{54}$ to $R_{57}$, $R_{62}$, $R_{63}$, and $R_{68}$ to $R_{71}$ each independently represent a hydrogen atom, or an alkyl group having 1 or more and 4 or less carbon atoms. $R_{60}$, $R_{61}$, $R_{66}$, and $R_{67}$ each independently represent a hydrogen atom, an alkoxy group having 1 or more and 4 or less carbon atoms, or an alkyl group having 1 or more and 4 or less carbon atoms. n3, m3, q3, s3, t3, and u3 each independently represent an integer of 1 or more and 8 or less. p3 and r3 each independently represent an integer of 4 or more and 12 or less. It should be noted that a symbol "***" represents a site to be bonded to the silicon atom in the formula (17). Specific examples of the hydrolyzable silane compound having a structure represented by the formula (17) are described below.

(1-1): Glycidoxypropyltrimethoxysilane
(1-2): Glycidoxypropyltriethoxysilane
(1-3): Epoxycyclohexylethyltrimethoxysilane
(1-4): Epoxycyclohexylethyltriethoxysilane

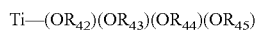

Formula (18)

In the formula (18), $R_{42}$ to $R_{45}$ each independently represents a hydrocarbon group. Each of $R_{42}$ to $R_{45}$ preferably represents a hydrocarbon group having 1 or more and 18 or less carbon atoms from the viewpoint of the rate of the reaction. Further, each of $R_{42}$ to $R_{45}$ more preferably represents a methyl group, an ethyl group, an n-propyl group, an i-propyl group, an n-butyl group, or a t-butyl group from the viewpoints of general-purpose property and handleability as well as the reaction rate. Specific examples of the hydrolyzable titanium compound having a structure represented by the formula (18) are described below.

(3-1): Tetramethoxytitanium
(3-2): Tetraethoxytitanium
(3-3): Tetrapropoxytitanium
(3-4): Tetra-i-propoxytitanium
(3-5): Tetrabutoxytitanium
(3-6): Tetra-t-butoxytitanium

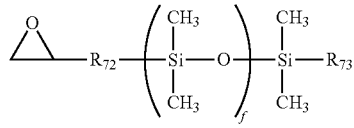

Formula (23)

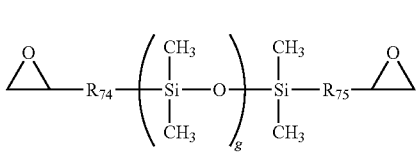

Formula (24)

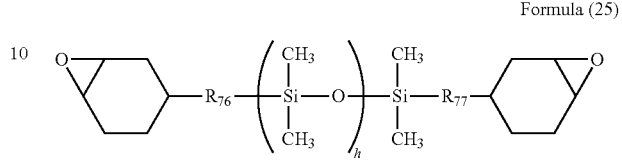

Formula (25)

$R_{72}$ to $R_{77}$ each independently represent an alkyl group having 1 or more and 6 or less carbon atoms, or a hydrocarbon group partially substituted with an ether group. f to h each independently represents an integer of 1 or more and 1,350 or less. It should be noted that the number of carbon atoms of the hydrocarbon group partially substituted with an ether group is preferably 1 or more and 4 or less from the viewpoint of ease of availability. —$CH_2$—O—$(CH_2)_3$— can be given as an example of the hydrocarbon group partially substituted with an ether group.

The silicone oil has a weight-average molecular weight Mw of preferably 100 or more and 100,000 or less, particularly preferably 300 or more and 100,000 or less. Setting the weight-average molecular weight Mw of the silicone oil within the range can sufficiently reduce the surface free energy of the surface layer. In addition, such silicone oil hardly causes the opacification of an application liquid for forming the surface layer because the silicone oil has a good affinity for an aqueous medium in the application liquid for forming the surface layer. Accordingly, a surface layer having a uniform thickness can be formed.

It should be noted that a gel permeation chromatography apparatus (trade name: HLC-8120GPC (trade name), manufactured by TOSOH CORPORATION) can be used in the measurement of the weight-average molecular weight of the silicone oil. In addition, five columns (guard column (trade name: TSK guardcolumn Super H-L), trade name: TSKgel Super H4000, trade name: TSKgel Super H3000, trade name: TSKgel Super H2000, trade name: TSKgel Super H1000) connected to one another can be used as a column.
In addition, for example, toluene for high-performance liquid chromatography can be used as an eluent.
Further, the measurement can be performed under specifically, for example, the conditions of the temperatures of an inlet, an oven, and an RI detector of 40° C., 40° C., and 40° C., respectively. The RI detector can be used for detection and polystyrene standards (EasiCal PS-2) are used in the creation of a calibration curve.

In addition, the silicone oils can be classified into four kinds, i.e., a one-terminal-modified type, a side-chain-modified type, a both-terminals-modified type, and a side-chain-and-both-terminals-modified type depending on the position at which an organic chain including an epoxy group is bonded. Of those, the one-terminal-modified and both-terminals-modified oils are particularly preferred because the oils easily exert their effects, and further, the one-terminal-modified oil is more preferred. It should be noted that the silicone oil represented by the formula (23) is of the one-terminal-modified type, and the silicone oils represented by the formula (24) and the formula (25) are each of the both-terminals-modified type.

Table 1-1 below shows specific examples of the epoxy-modified silicone oil represented by the formula (23).

TABLE 1-1

| | |
|---|---|
| (4-1) | X22-173DX (trade name, functional group equivalent weight: 4,500 g/mol, manufactured by Shin-Etsu Chemical Co., Ltd.) |
| (4-2) | X22-173BX (trade name, functional group equivalent weight: 2,490 g/mol, manufactured by Shin-Etsu Chemical Co., Ltd.) |

Table 1-2 below shows specific examples of the epoxy-modified silicone oil having a structure represented by the formula (24).

TABLE 1-2

| | |
|---|---|
| (5-1) | X22-163 (trade name, functional group equivalent weight: 200 g/mol, manufactured by Shin-Etsu Chemical Co., Ltd.) |
| (5-2) | KF-105 (trade name, functional group equivalent weight: 490 g/mol, manufactured by Dow Corning Toray Co., Ltd.) |
| (5-3) | X22-163A (trade name, functional group equivalent weight: 1,000 g/mol, manufactured by Shin-Etsu Chemical Co., Ltd.) |
| (5-4) | X22-163B (trade name, functional group equivalent weight: 1,750 g/mol, manufactured by Shin-Etsu Chemical Co., Ltd.) |
| (5-5) | X22-163C (trade name, functional group equivalent weight: 2,700 g/mol, manufactured by Shin-Etsu Chemical Co., Ltd.) |

Table 1-3 below shows specific examples of the epoxy-modified silicone oil having a structure represented by the formula (25).

TABLE 1-3

| | |
|---|---|
| (6-1) | X22-169AS (trade name, functional group equivalent weight: 500 g/mol, manufactured by Shin-Etsu Chemical Co., Ltd.) |
| (6-2) | X22-169B (trade name, functional group equivalent weight: 1,700 g/mol, manufactured by Shin-Etsu Chemical Co., Ltd.) |

Alternatively, the polymer compound according to the present invention can be a reaction product of a hydrolyzed condensate of the hydrolyzable compound represented by the formula (17), the hydrolyzable compound represented by the formula (18), and a hydrolyzable compound represented by the following formula (26), and at least one of the epoxy-modified silicone oils represented by the formulae (23) to (25).
In this case, the solubility of the hydrolyzed condensate in the paint for forming the surface layer can be improved, and by extension, the coating properties of the paint for forming the surface layer can be improved. As a result, the occurrence of unevenness in the film physical properties of the surface layer according to the present invention can be effectively suppressed.

$R_{78}$—Si(OR$_{79}$)(OR$_{80}$)(OR$_{81}$)  Formula (26)

In the formula (26), $R_{78}$ represents an alkyl group or an aryl group, and $R_{79}$ to $R_{81}$ each independently represent a hydrocarbon group. When $R_{78}$ represents an alkyl group, the alkyl group is preferably a linear alkyl group having 1 or more and 21 or less carbon atoms from the viewpoint of general-purpose property, and is more preferably a linear alkyl group having 6 or more and 10 or less carbon atoms from the viewpoints of the rate of the reaction and the hardness of the compound. When $R_{78}$ in the formula (26) represents an alkyl group, the solubility and the coating properties can be easily improved.
The aryl group is preferably a phenyl group from the viewpoint of the general-purpose property. In addition, when $R_{78}$ represents a phenyl group, the electrical characteristics of the cured film, in particular, its volume resistivity can be easily improved.
Examples of the hydrocarbon group represented by $R_{79}$ to $R_{81}$ in the formula (26) include an alkyl group, an alkenyl group, and an aryl group. Of those, a linear or branched alkyl group having 1 or more and 4 or less carbon atoms is preferred from the viewpoint of the rate of the reaction, and specifically, a methyl group, an ethyl group, an n-propyl group, an i-propyl group, an n-butyl group, or a t-butyl group is more preferred.
Specific examples of the hydrolyzable silane compound having a structure represented by the formula (26) are described below.

(2-1): Methyltrimethoxysilane
(2-2): Methyltriethoxysilane
(2-3): Methyltripropoxysilane
(2-4): Ethyltrimethoxysilane
(2-5): Ethyltriethoxysilane
(2-6): Ethyltripropoxysilane
(2-7): Propyltrimethoxysilane
(2-8): Propyltriethoxysilane
(2-9): Propyltripropoxysilane
(2-10): Hexyltrimethoxysilane
(2-11): Hexyltriethoxysilane
(2-12): Hexyltripropoxysilane
(2-13): Decyltrimethoxysilane
(2-14): Decyltriethoxysilane
(2-15): Decyltripropoxysilane
(2-16): Phenyltrimethoxysilane
(2-17): Phenyltriethoxysilane
(2-18): Phenyltripropoxysilane When two or more kinds of hydrolyzable silane compounds each having a structure represented by the formula (26) are used in combination, and one kind thereof is a hydrolyzable silane compound in which $R_{78}$ represents a phenyl group, a hydrolyzable silane compound in which $R_{78}$ represents a linear alkyl group having 6 or more and 10 or less carbon atoms is preferably used in combination with the compound. In this case, the compatibility of the hydrolyzed condensate with the solvent becomes good even when a monomer structure changes owing to hydrolysis and a condensation reaction.
The charging member according to the present invention can be produced by, for example, the following method. That is, the charging member can be produced by: applying, onto the electro-conductive elastic layer, the paint containing the first or second condensate and at least one of the silicone oils to form a coating film; and crosslinking the condensate and the silicone oil in the coating film after the formation to form the polymer compound as the surface layer.

(Production of Surface Layer)
Here, a method of preparing the paint for forming the surface layer as a production example of the polymer compound, and a method involving forming the polymer compound on the outer periphery of the electro-conductive elastic layer with the paint to produce the surface layer are more specifically described.
The charging member according to the present invention can be synthesized through, for example, the following steps (1) to (6).
Here, a component (A) is the hydrolyzable silane compound represented by the formula (17), a component (B) is the hydrolyzable silane compound represented by the formula (26), and a component (C) is the hydrolyzable titanium compound represented by the formula (18). In addition, a component (G) is an epoxy-modified silicone oil represented by any one of the formulae (23) to (25).

(1) A step including adjusting a molar ratio among the component (A), the component (B), and the component (C).
(2) A step including mixing the component (A) and the component (B), adding water and an alcohol to the mixture, and performing hydrolysis and a condensation reaction after the addition.
(3) A step including adding the component (C) to the solution subjected to the hydrolysis and the condensation, and further performing hydrolysis and a condensation reaction.
(4) A step including adding the component (G) diluted with a ketone-based solvent to the solution containing the condensate obtained by the step (3), further adding a photopolymerization initiator to the mixture, and adjusting the solid content concentration of the mixture as required to produce the paint for forming the surface layer.
(5) A step including forming a coating film of the paint on the electro-conductive elastic layer formed on the support.
(6) A step including causing the hydrolyzed condensates, and the hydrolyzed condensate and the silicone oil according to the present invention in the coating film to react with each other to cure the coating film so that the surface layer according to the present invention may be formed.

Step (1)

The molar ratio among the component (A), the component (B), and the component (C) is adjusted. At that time, the molar ratio is preferably adjusted to satisfy the relationship of "$0.1 \leq$ component (C)/(component (A)+component (B))$\leq 12.5$." A ratio of 0.1 or more is additionally effective in improving the charging ability. A ratio of 12.5 or less can easily stabilize the coating properties and storage stability of the solution. The relationship of "$1.0 \leq$ component (C)/(component (A)+component (B))$\leq 10.0$" is more preferably satisfied.

In addition, the molar ratio "component (A)/(component (A)+component (B))" between the component (A) and the component (B) is preferably 0.10 or more and 0.85 or less. When the ratio falls within the range, the paint can be easily prevented from becoming opaque owing to a reduction in reactivity with the component (C) or in solubility in the solvent to be used. The molar ratio "component (A)/(component (A)+component (B))" is more preferably 0.10 or more and 0.70 or less.

Step (2)

Subsequently, the component (A) and the component (B) are mixed. At that time, the component (C) may be added simultaneously with the component (A) and the component (B). In this case, the step (3) can be omitted. Alternatively, the component (C) may be added at two stages, i.e., at the steps (2) and (3). It should be noted that only one kind of each of the component (A) and the component (B) as hydrolyzable silane compounds may be used, or two or more kinds of the components (A) or (B) may be used.

Next, water and the alcohol are added to the resultant mixture to perform the hydrolysis and the condensation reaction. The hydrolysis and the condensation reaction can be performed by reflux under heating. At that time, a ratio "water/(component (A)+component (B))" of the addition amount (number of moles) of water to the number of moles of the component (A) and the component (B) is preferably 0.3 or more and 6.0 or less, particularly preferably 1.2 or more and 1.8 or less.

Setting the value for the ratio "water/(component (A)+component (B))" within the range enables efficient progress of the condensation by the hydrolysis and hence can suppress the inclusion of an unreacted monomer in the hydrolyzed condensate.

In addition, such setting can suppress excessively rapid progress of the condensation reaction by the hydrolysis and hence can suppress the occurrence of the opacification of the paint or of a precipitate in the paint.

From the viewpoint of compatibility, there may be preferably used, as the alcohol, a primary alcohol, a secondary alcohol, a tertiary alcohol, a mixture of a primary alcohol and a secondary alcohol, or a mixture of a primary alcohol and a tertiary alcohol. From the viewpoint of improving the coating properties of the paint, ethanol, a mixture of methanol and 2-butanol, or a mixture of ethanol and 2-butanol is particularly preferably used. It should be noted that the addition amount of the alcohol is preferably adjusted depending on a required state of the product because the addition amount affects the rate of the condensation reaction by the hydrolysis of the component (A) and the component (B).

Steps (3) and (4)

The component (C) is added to the solution obtained by the step (2), and then hydrolysis and a condensation reaction are further performed. The hydrolysis and the condensation reaction can also be performed by reflux under heating. After that, the component (G) diluted with the ketone-based solvent and the photopolymerization additive are added to the resultant. For example, methyl ethyl ketone can be used as the ketone-based solvent.

The component (G) is preferably blended in an amount of 1.0 part by mass or more and 30 parts by mass or less with respect to 100 parts by mass of the hydrolyzed condensate of the component (A), the component (B), and the component (C) in order that a surface layer having a low surface free energy may be formed.

The use of the epoxy-modified silicone oil having a structure represented by any one of the formulae (23) to (25) enables one to easily obtain a structure represented by any one of the formulae (8) to (12) upon crosslinking with the condensate synthesized in the steps (1) to (3). In addition, such silicone oil is preferred because of the following reason. The oil is easily exposed to the outermost surface of the charging member when used in the coating because its dimethyl silicone portion has a high degree of freedom. Accordingly, the effects of the silicone oil on the physical properties of the outermost surface such as a surface free energy and a coefficient of dynamic friction appear in an additionally easy fashion.

In addition, an onium salt of a Lewis acid or a Bronsted acid is preferably used as the photopolymerization initiator. Other examples of the cationic polymerization catalyst include a borate, a compound having an imide structure, a compound having a triazine structure, an azo compound, and a peroxide.

The photopolymerization initiator can be diluted with a solvent such as an alcohol and a ketone in advance in order that its compatibility with the coating agent may be improved. Examples of the solvent to be used in the dilution include methanol and methyl isobutyl ketone (MIBK). Of such various cationic polymerization catalysts, an aromatic sulfonium salt and an aromatic iodonium salt are preferred from the viewpoints of sensitivity, stability, and reactivity. In particular, a bis(4-tert-butylphenyl)iodonium salt, a compound having a structure represented by the following formula (27) (trade name: Adekaoptomer SP150, manufactured by ADEKA CORPORATION):

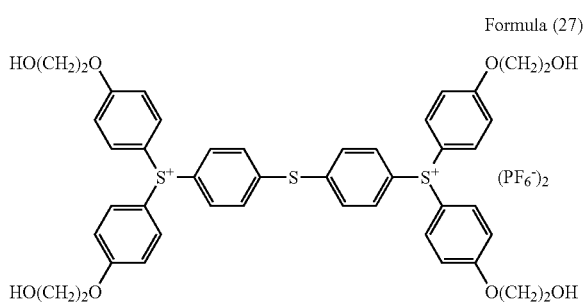

Formula (27)

and a compound having a structure represented by the following formula (28) (trade name: IRGACURE 261, manufactured by Ciba Specialty Chemicals Inc.):

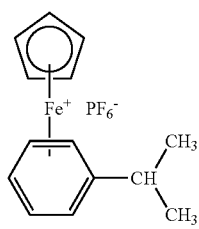

Formula (28)

are preferred.

Step (5)

The solid content concentration of the reaction solution obtained in the foregoing is adjusted as required. Thus, the paint for forming the surface layer is obtained. For example, an alcohol such as ethanol and 2-butanol, ethyl acetate, or methyl ethyl ketone, or a mixture thereof can be used in the adjustment of the solid content concentration.

The solid content concentration of the paint is preferably 0.05 mass % or more and 4.0 mass % or less from the viewpoints of improving the coating properties and suppressing coating unevenness.

Next, the paint is applied onto the electro-conductive elastic layer to form the coating film on the outer periphery of the elastic layer. An approach such as application with a roll coater, dip coating, and ring application can be employed as a method of applying the paint.

Step (6)

In this step, the hydrolyzed condensates, and the hydrolyzed condensate and the silicone oil as the component (G) in the coating film are caused to reach with each other to cure the coating film so that the surface layer according to the present invention may be formed.

Specifically, the coating film is irradiated with an active energy ray. Thus, in the coating film, a cationically polymerizable group which the hydrolyzed condensate of the component (A), the component (C), and the component (B) as an option has, e.g., an epoxy group is cleaved, and an epoxy group of the silicone oil as the component (G) is also cleaved. Then, the condensate and the oil are caused to react with each other. Thus, the coating film is cured and hence the surface layer is formed. The photopolymerization initiator can be cured through the irradiation with the active energy ray. When the energy ray is applied, an epoxy group in the hydrolyzed condensate (such as an epoxy group in $R_{38}$ of the formula (17)) and a cationically polymerizable group in the epoxy-modified silicone oil (such as an epoxy group) in the coating agent are cleaved and polymerized. Thus, the silane condensates (hydrolyzed condensates), and the silane condensate and the epoxy-modified silicone oil are crosslinked with each other, thereby curing the film. In other words, the immobilization of the silicone oil to the silane condensate occurs simultaneously with the curing of the coating film.

It should be noted that the active energy ray is preferably ultraviolet light. When the surface layer is cured with ultraviolet light, excess heat is hardly generated. In addition, a phase separation due to the volatilization of the solvent such as heat curing hardly occurs, and hence an extremely uniform film state can be obtained. As a result, a uniform, stable potential can be provided for a photosensitive member.

When the active energy ray is applied, the heating of the coating film results in the expansion of the electro-conductive elastic layer due to the heat. After the expansion, the layer contracts by being cooled. At that time, if the surface layer cannot sufficiently follow the expansion and contraction, a wrinkle or crack may occur in the surface layer. However, when ultraviolet light is used in the crosslinking reaction, the hydrolyzable condensates, and the hydrolyzable condensate and the epoxy-modified silicone oil can be caused to react with each other within a relatively short time period, e.g., about 15 minutes. As a result, the generation of heat in the coating film is suppressed, and the occurrence of a wrinkle or crack in the surface layer to be obtained can also be suppressed.

Further, when the environment under which the charging member is placed is an environment whose temperature and humidity change abruptly, a wrinkle or crack may occur in the surface layer unless the surface layer sufficiently follows the expansion and contraction of the electro-conductive elastic layer due to the changes in temperature and humidity. However, when the crosslinking reaction is performed with ultraviolet light that results in the generation of a small quantity of heat, the adhesiveness between the electro-conductive elastic layer and the surface layer is improved, and hence the surface layer is able to sufficiently follow the expansion and contraction of the electro-conductive elastic layer. Accordingly, a wrinkle or crack in the surface layer due to changes in the temperature and humidity of an environment can be suppressed. In addition, when the crosslinking reaction is performed with ultraviolet light, the deterioration of the electro-conductive elastic layer due to thermal hysteresis can be easily suppressed. Accordingly, reductions in the electrical characteristics of the electro-conductive elastic layer can also be easily suppressed.

A high-pressure mercury lamp, a metal halide lamp, a low-pressure mercury lamp, an excimer UV lamp, or the like can be used for the application of ultraviolet light. Of those, an ultraviolet light source rich in ultraviolet light having a wavelength of 150 nm or more and 480 nm or less is preferably used. It should be noted that the integral light quantity of ultraviolet light is defined as the following calculation equation (3).

Ultraviolet integral light quantity [mJ/cm$^2$]= ultraviolet light intensity [mW/cm$^2$]× irradiation time [s]   Calculation equation (3)

The integral light quantity of ultraviolet light can be adjusted depending on, for example, the irradiation time, a lamp output, and a distance between the lamp and a body to be irradiated. In addition, the integral light quantity may be provided with a gradient within the irradiation time.

When a low-pressure mercury lamp is used, the integral light quantity of ultraviolet light can be measured with an ultraviolet integral actinometer "UIT-150-A" or "UVD- S254" (both are trade names) manufactured by USHIO INC. Further, when an excimer UV lamp is used, the integral light quantity of ultraviolet light can be measured with an ultraviolet integral actinometer "UIT-150-A" or "VUV-S172" (both are trade names) manufactured by USHIO INC.

(Electrophotographic Apparatus)

Figure 2:
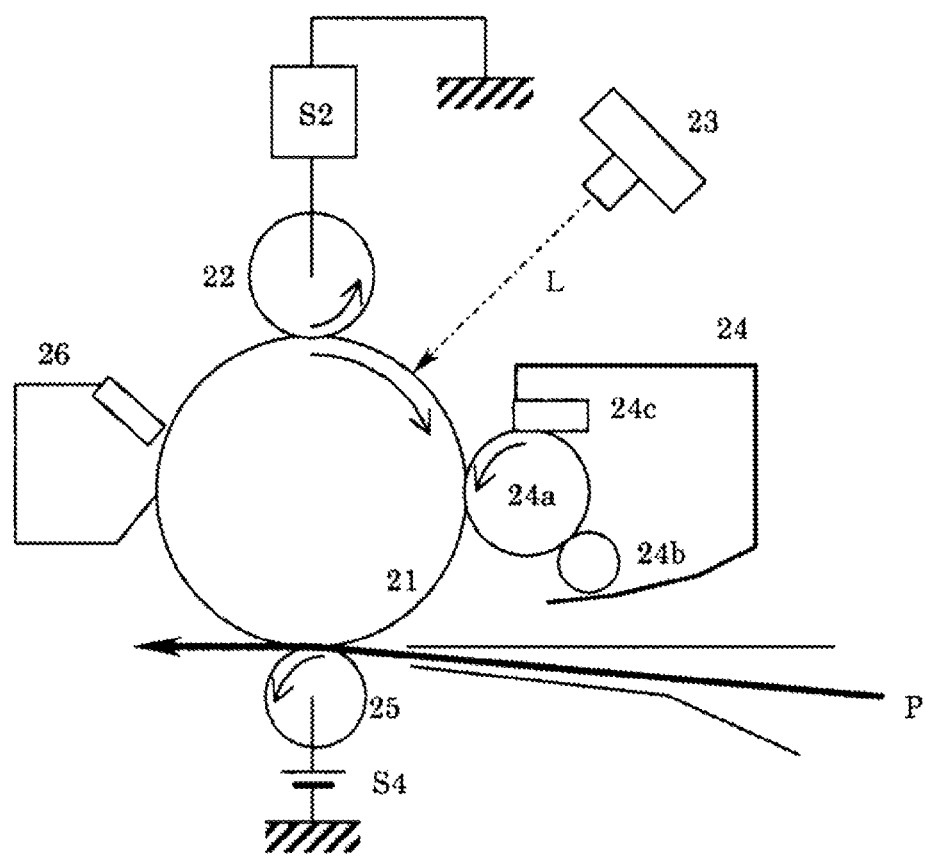
FIG. 2 is a view illustrating an example of the schematic construction of an electrophotographic apparatus including a process cartridge having the charging member of the present invention.

FIG. 2 illustrates an example of the schematic construction of an electrophotographic apparatus including a process cartridge having the charging member of the present invention.

Reference numeral 21 represents a rotating drum type electrophotographic photosensitive member (photosensitive member) as an image-bearing member. The photosensitive member 21 is rotationally driven in clockwise direction as indicated by an arrow in the figure at a predetermined circumferential speed (process speed). Reference numeral 22 represents a charging roller as the charging member. A charging bias-applying power source S2 that applies a charging bias to the charging roller 22 constitutes charging unit. The charging roller 22 is brought into contact with the photosensitive member 21 at a predetermined pressing force, and is rotationally driven in the forward direction with respect to the rotation of the photosensitive member 21. A predetermined DC voltage (set to −1,050 V in each of examples to be described later) is applied (according to a DC charging mode) from the charging bias-applying power source S2 to the charging roller 22. As a result, the surface of the photosensitive member 21 is subjected to a charging treatment uniformly so as to have a predetermined polarity and a predetermined potential (a dark portion potential was set to −500 V in each of the examples to be described later).

Reference numeral 23 represents exposing unit. Known unit can be utilized as the exposing unit 23, and the unit can be suitably exemplified by a laser-beam scanner. Reference symbol L represents exposing light.

The surface of the photosensitive member 21 subjected to the charging treatment is subjected to image exposure corresponding to target image information by the exposing unit 23. As a result, the potential of the exposed light portion on the charged surface of the photosensitive member (a potential of the light portion was set to −150 V in each of the examples to be described later) selectively reduces (attenuates), and hence an electrostatic latent image is formed on the photosensitive member 21.

Reference numeral 24 represents reversal developing unit. Known unit can be utilized as the developing unit 24. The developing unit 24 illustrated in FIG. 2 is constructed so as to have: a toner carrying member 24a for carrying and conveying toner, the toner carrying member being provided for the opening portion of a developer container for storing the toner; a stirring member 24b for stirring the stored toner; and a toner-regulating member 24c for regulating the amount of the toner carried by the toner carrying member 24a (toner layer thickness). The developing unit 24 selectively causes toner (negative toner) charged so as to be identical in polarity to the charged polarity of the photosensitive member 21 to adhere to the exposed light portion of the electrostatic latent image on the surface of the photosensitive member 21 to visualize the electrostatic latent image as a toner image (a developing bias was set to −400 V in each of the examples to be described later). There is no particular limitation on a development mode, and any known method can be employed. Examples of the known method include a jumping development mode, a contact development mode, and a magnetic brush mode. Of these, a contact development mode can be said to be particularly preferred for an image-forming apparatus that outputs color images, for the purpose of, for example, alleviating the extent to which toner scatters.

Reference numeral 25 represents a transfer roller as transfer unit. Known unit can be utilized as the transfer roller 25, and the unit can be exemplified by a transfer roller obtained by coating the top of an electro-conductive support such as a metal with an elastic resin layer whose resistance is adjusted to a medium level. The transfer roller 25 is brought into contact with the photosensitive member 21 at a predetermined pressing force, and rotates in the forward direction with respect to the rotation of the photosensitive member 21 at substantially the same circumferential speed as the rotating circumferential speed of the photosensitive member 21. In addition, a transfer voltage opposite in polarity to the charged characteristic of the toner is applied from a transfer bias-applying power source S4. A transfer material P is fed into a contact portion between the photosensitive member 21 and the transfer roller from a sheet-feeding mechanism (not shown) at a predetermined timing, and the back surface of the transfer material P is charged so as to be opposite in polarity to the charged polarity of the toner by the transfer roller 25 to which the transfer voltage has been applied. As a result, the front surface side of the transfer material P receives the toner image on the photosensitive member 21 by electrostatic transfer at the contact portion between the photosensitive member 21 and the transfer roller.

The transfer material P onto which the toner image has been transferred is separated from the surface of the photosensitive member, and is then introduced into toner image-fixing unit (not shown) where the toner image is fixed so as to be output as an image-formed product. In the case of a double images formation mode or a multiple images formation mode, the image-formed product is introduced into a recirculation conveying mechanism (not shown), and is then reintroduced into a transfer portion. A residue on the photosensitive member 21 such as transfer residual toner is collected from the top of the photosensitive member by cleaning unit 26 of, for example, a blade type. In addition, when residual charge remains on the photosensitive member 21, it is recommended that the residual charge on the photosensitive member 21 be removed with a pre-exposing apparatus (not shown) after the transfer before primary charging by the charging member 22 is performed. Used in the image formation of each of the examples to be described later was an apparatus that did not use any pre-exposing apparatus.

The process cartridge integrally supports at least the charging member 22 and the photosensitive member 21, and can be detachably mountable to the main body of the electrophotographic apparatus. Used in each of the examples to be described later was a process cartridge integrally supporting the charging member 22, the photosensitive member 21, the developing unit 24, and the cleaning unit 26.

(1) Formation and Evaluation of Electro-Conductive Elastic Layer

Hereinafter, the present invention is described in more detail by way of specific examples. It should be noted that the term "part(s)" in the examples refers to "part(s) by mass."

Example 1

Materials shown in Table 2 were mixed in a 6-L pressure kneader (the apparatus used here was available under the trade name "TD6-15MDX" from TOSHIN CO., LTD.) at a filling ratio of 70 vol % and a blade speed of 30 rpm for 24 minutes. Thus, an unvulcanized rubber composition was obtained. 4.5 Parts of tetrabenzylthiuram disulfide (trade name: Sanceler TBZTD, manufactured by SANSHIN CHEMICAL INDUSTRY CO., LTD.) as a vulcanization accelerator and 1.2 parts of sulfur as a vulcanizing agent were added to 174 parts by mass of the unvulcanized rubber composition. Then, the mixture was bilaterally cut a total of twenty times with open rolls each having a roll diameter of 30.5 cm (12 inches) at a front roll speed of 8 rpm, a back roll speed of 10 rpm, and a roll interval of 2 mm. After that, the resultant was subjected to tight milling ten times at a roll interval of 0.5 mm. Thus, a kneaded product I for an elastic layer was obtained.

TABLE 2

| Raw material | Usage |
|---|---|
| Medium high acrylonitrile NBR (trade name: Nipol DN219, central value of the amount of combined acrylonitrile: 33.5%, central value of a Mooney viscosity: 27, manufactured by Zeon Corporation) | 100 parts |
| Carbon black for coloring (filler) (trade name: #7360SB, particle diameter: 28 nm, nitrogen adsorption specific surface area: 77 m²/g, DBP absorption: 87,100 cm³/100 g, manufactured by TOKAI CARBON CO., LTD.) | 48 parts |
| Calcium carbonate (filler) (trade name: NANOX #30, manufactured by MARUO CALCIUM CO., LTD.) | 20 parts |
| Zinc oxide | 5 parts |
| Zinc stearate | 1 part |

Next, a columnar support made of steel having a diameter of 6 mm and a length of 252 mm (having a nickel-plated surface) was prepared. Then, a thermosetting adhesive containing a metal and a rubber (trade name: METALOC U-20, manufactured by TOYO KAGAKU KENKYUSHO CO., LTD.) was applied to a region extending by up to 115.5 mm on both sides each with respect to the center in the axial direction of the columnar surface of the support (region having a total width in the axial direction of 231 mm). The resultant was dried at a temperature of 80° C. for 30 minutes, and was then further dried at a temperature of 120° C. for 1 hour. Thus, a cored bar with an adhesive layer was obtained.

The kneaded product I was subjected to extrusion molding with a crosshead to be coaxially extruded into a cylindrical shape having an outer diameter of 8.75 to 8.90 mm simultaneously with the cored bar with an adhesive layer as a center, and then its ends were cut. Thus, an electro-conductive elastic roller 1 in which an unvulcanized electro-conductive elastic layer was laminated on the outer periphery of the cored bar was produced. An extruder used was an extruder having a cylinder diameter of 70 mm and an L/D of 20. With regard to temperature regulation at the time of the extrusion, the temperature of a head was set to 90° C., the temperature of the cylinder was set to 90° C., and the temperature of a screw was set to 90° C.

Next, the roller 1 was vulcanized with a continuous heating furnace having two zones set to different temperatures. The roller was passed through a first zone whose temperature had been set to 80° C. in 30 minutes, and was then passed through a second zone whose temperature had been set to 160° C. also in 30 minutes. Thus, a vulcanized electro-conductive elastic roller 2 was obtained.

Next, both ends of the electro-conductive elastic layer portion (rubber portion) of the electro-conductive elastic roller 2 before surface grinding were cut so that the electro-conductive elastic layer portion had a width in an axial direction of 232 mm. After that, the surface of the electro-conductive elastic layer portion was ground with a rotary grindstone (number of revolutions of a workpiece: 333 rpm, number of revolutions of the grindstone: 2,080 rpm, grinding time: 12 seconds). Thus, an electro-conductive elastic roller 3 (electro-conductive elastic roller after surface grinding) was obtained. The electro-conductive elastic roller 3 was of a crown shape having a diameter at each end of 8.26 mm and a diameter at the central portion of 8.50 mm, and its surface had a ten-point average roughness (Rz) of 5.5 μm, and a runout of 18 μm.

The ten-point average roughness (Rz) was measured in conformity with JIS B 0601.

The runout was measured with a high-accuracy laser measuring machine (trade name: LSM-430v, manufactured by Mitutoyo Corporation). Specifically, outer diameters were measured with the measuring machine, and then a difference between the maximum outer diameter and the minimum outer diameter was defined as an outer diameter difference runout. The measurement was performed at five points, and then the average of the outer diameter difference runouts at the five points was defined as the runout of the product subjected to the measurement.

(2) Synthesis and Evaluation of Condensate

Next, a mixture 1 for forming a surface layer was synthesized by the following three-stage reaction.

(Reaction in First Stage)

The respective components shown in Table 3 below were mixed in a 300-ml eggplant flask. After that, the mixture was stirred at room temperature for 30 minutes. Subsequently, the mixture was refluxed under heating with an oil bath at 120° C. for 20 hours. Thus, a condensate intermediate 1-1 of hydrolyzable silane compounds as a condensate intermediate-I was obtained. A series of stirrings was performed at 750 rpm.

The theoretical solid content of the condensate intermediate 1-1 (the mass ratio of a polysiloxane polymer to the total mass of the solution when it is assumed that all hydrolyzable silane compounds undergo dehydration condensation) is 28.0 mass %.

TABLE 3

| Raw material | Usage | |
|---|---|---|
| Glycidoxypropyltrimethoxysilane (GPTMS) (trade name: KBM-403, manufactured by Shin-Etsu Chemical Co., Ltd.) | 11.68 g | (0.049 mol) |
| Hexyltrimethoxysilane (HeTMS) (trade name: KBM-3063, manufactured by Shin-Etsu Chemical Co., Ltd.) | 62.74 g | (0.301 mol) |
| Ethanol (manufactured by KISHIDA CHEMICAL Co., Ltd., reagent grade) | 91.87 g | |
| Ion-exchanged water | 11.34 g | |

(Reaction in Second Stage)

Next, 158.16 g (0.517 mol) of tetraisopropoxytitanium (manufactured by Kojundo Chemical Laboratory Co., Ltd.) were added to 18.63 g of the condensate intermediate 1-1 and then the mixture was stirred at room temperature for 3 hours. Thus, a condensate intermediate 1-2 as a condensate intermediate-II was obtained. A series of stirrings was performed at 750 rpm.

(Reaction in Third Stage)

Next, 90 g of methyl ethyl ketone (MEK) were added to 10 g of a one-terminal-epoxy-modified silicone oil (trade name: X22-173DX, manufactured by Shin-Etsu Silicone). Thus, a 10-mass % oil diluted product 1 was prepared. Table 17 shows the structure of the epoxy-modified silicone oil.

28 Grams of the oil diluted product 1 were added to 100 g of the condensate intermediate 1-2. Further, 3.00 g of an aromatic sulfonium salt (trade name: Adekaoptomer SP-150, manufactured by ADEKA CORPORATION) as a photocationic polymerization initiator diluted with methyl isobutyl ketone (MIBK) to 10 mass % were added to the mixture. Thus, a mixture of the condensate intermediate 1-2 and the silicone oil was obtained. The resultant mixture is referred to as "mixture 1." A ratio "solid content of the condensate intermediate 1-2:one-terminal-epoxy-modified silicone oil" is 100.0:10.0 (in terms of parts by mass).

<Evaluation (1); Analysis of Structure in Cured Film of Mixture 1>
A structure in a film corresponding to the surface layer according to the present invention was analyzed with the "mixture 1."
A sample for evaluation was prepared as described below. That is, the "mixture 1" was applied to the degreased surface of a sheet made of aluminum having a thickness of 100 μm by spin coating. An apparatus (trade name: 1H-D7, manufactured by MIKASA CO., LTD.) was used as a spin coating apparatus. The spin coating was performed under the conditions of a rotational speed of 300 rpm and a time of rotation of 2 seconds.
Then, the coating film of the "mixture 1" was dried. After that, the coating film was irradiated with ultraviolet light having a wavelength of 254 nm. Thus, the coating film was cured. The integral light quantity of the ultraviolet light with which the coating film was irradiated was set to 9,000 mJ/cm$^2$. It should be noted that a low-pressure mercury lamp (manufactured by HARISON TOSHIBA LIGHTING Corporation) was used in the irradiation with the ultraviolet light. Next, the cured film was released from the sheet made of aluminum and then pulverized with a mortar made of agate. Thus, a sample for NMR measurement was prepared. The $^{29}$Si-NMR spectrum and $^{13}$C-NMR spectrum of the sample were measured with a nuclear magnetic resonance apparatus (trade name: JMN-EX400, manufactured by JEOL Ltd.).

Figure 4:
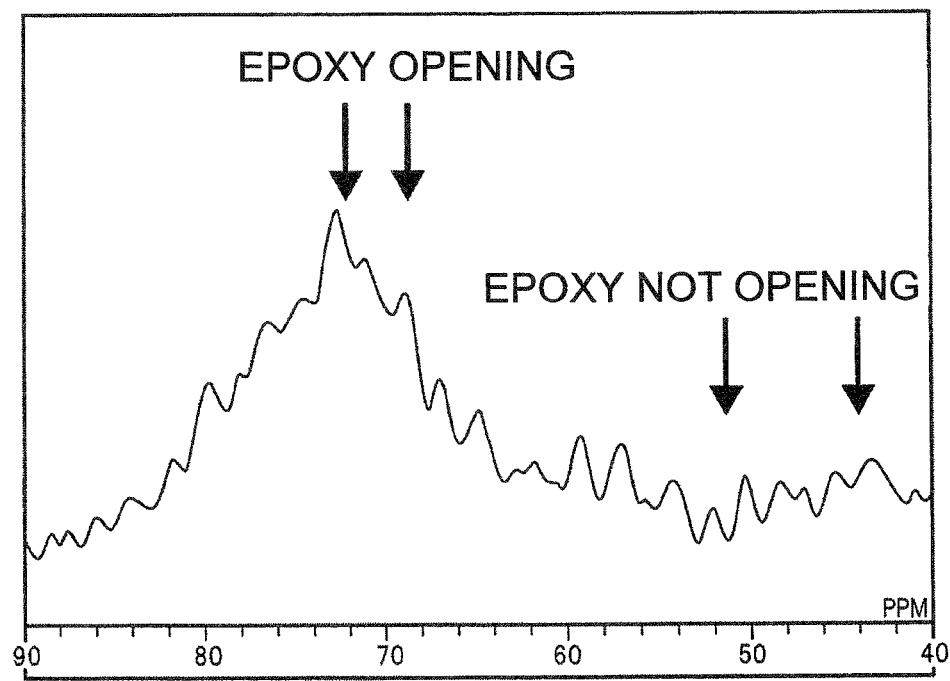
FIG. 4 is a graph showing an example of the result of the $^{13}$C-NMR measurement of a polymer compound constituting a surface layer.

FIG. 4 shows the $^{13}$C-NMR spectrum. Peaks each showing an epoxy group before ring-opening appear at around 44 ppm and 51 ppm, and the peak of a carbon atom after the ring-opening appears at around 69 ppm. It is understood from FIG. 4 that nearly no ring-unopened epoxy group exists in the cured film of the mixture 1 and hence an epoxy group has sufficiently reacted.

Figure 5:
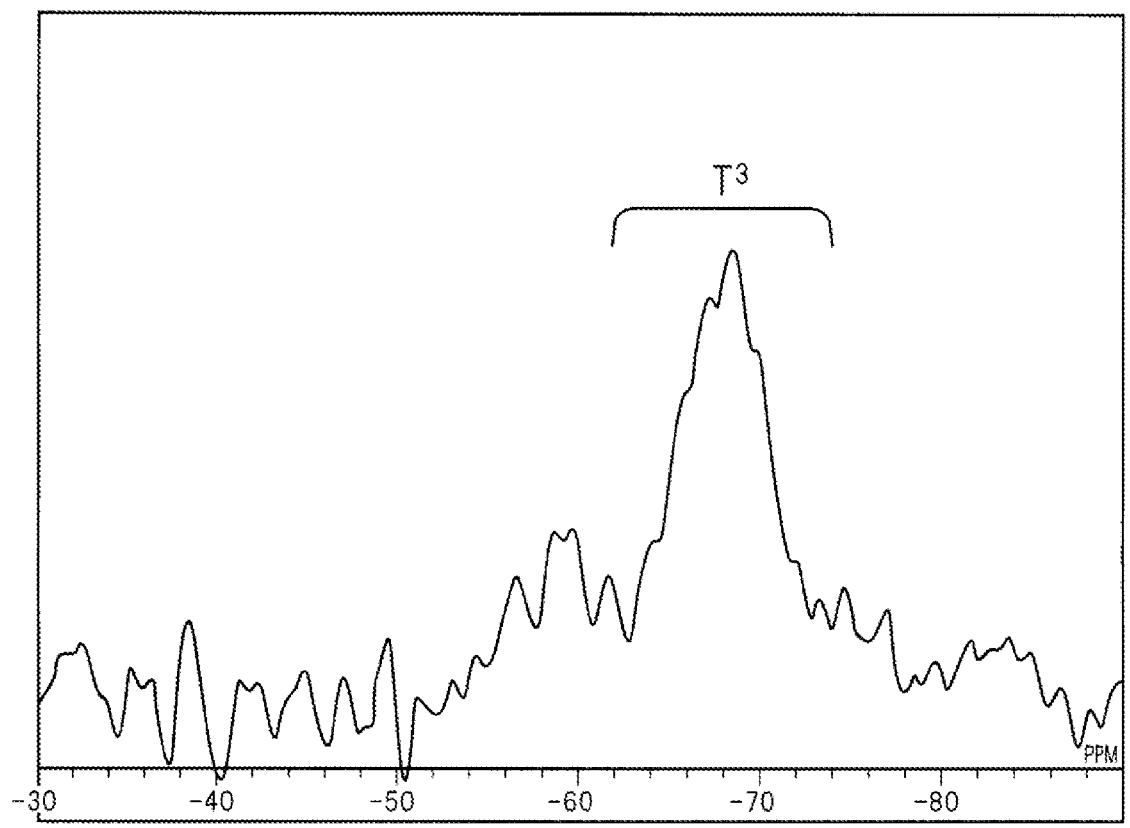
FIG. 5 is a graph showing an example of the result of the $^{29}$Si-NMR measurement of the polymer compound constituting the surface layer.

In addition, FIG. 5 shows the $^{29}$Si-NMR spectrum of the cured film. A peak at around −64 ppm to −74 ppm shows a T$^3$ component. Here, the term "T$^3$ component" refers to a state in which Si having one bond to an organic functional group has three bonds to other atoms (Si and Ti) through O, in other words, the state of —SiO$_{3/2}$, the state being such that all hydrolyzable groups have reacted and condensed. It was confirmed from FIG. 5 that a hydrolyzable silane compound having an epoxy group condensed and existed in the state of —SiO$_{3/2}$.

(Confirmation of Immobilization of Silicone Oil)
Further, 1 g of the pulverized product of the cured film and 150 ml of acetone were prepared, and then the silicone oil in the cured product was extracted with a Soxhlet extractor. The extract was analyzed by GPC. As a result, 30 mass % of the silicone oil not bonded to the condensate was detected. It is assumed that 70 mass % of the added silicone oil has crosslinked with glycidoxypropyltriethoxysilane because the crosslinking of the molecules of the silicone oil occurs in an extremely hard fashion.

(3) Production and Evaluation of Charging Roller; Subsequently, a Charging Roller 1 was Produced with the "Mixture 1" as Described Below.
First, the "mixture 1" was diluted with a mixed solvent containing ethanol and 2-butanol at a mass ratio of 1:1 so that the solid content was 1.0 mass %. Thus, a paint 1 for forming a surface layer was prepared. Here, the solid content contains a silicone oil content.

Next, the paint 1 was applied onto the electro-conductive elastic layer of the electro-conductive elastic roller 3 produced in advance (the electro-conductive elastic roller after surface grinding) by ring application (discharge amount: 0.020 ml/s, speed of a ring portion: 85 mm/s, total discharge amount: 0.065 ml). The coating film of the paint 1 was irradiated with ultraviolet light having a wavelength of 254 nm so that an integral light quantity was 9,000 mJ/cm$^2$. Thus, the coating film was cured, and as a result, a surface layer was formed. A low-pressure mercury lamp (manufactured by HARISON TOSHIBA LIGHTING Corporation) was used in the irradiation with the ultraviolet light. Thus, the charging roller 1 was produced. The charging roller 1 was subjected to the following evaluations (2) to (7).

<Evaluation (2); Calculation of Surface Free Energy>
In order to calculate the surface free energy of the charging roller 1, a contact angle with respect to each of three kinds of probe liquids each having three known components of the surface free energy shown in Table 4 below was measured with a contact angle meter (trade name: CA-X ROLL type, manufactured by Kyowa Interface Science Co., Ltd). Conditions under which the contact angle θ was measured are as described below.
Measurement: A drop method (perfect circle fitting)
Liquid amount: 1 μl
Recognition of droplet: Automatic
Image processing: Algorithm-nonreflection
Image mode: Frame
Threshold level: Automatic
It should be noted that L and S in the following description represent items concerned of a liquid and a solid, respectively. $\gamma^d$: dispersion force component, $\gamma^p$: polar component, $\gamma^h$: hydrogen bond component

TABLE 4

| Probe liquid | Kitazaki-Hata theory | | | |
| --- | --- | --- | --- | --- |
| | $\gamma_L^d$ | $\gamma_L^p$ | $\gamma_L^h$ | $\gamma_L^{Total}$ |
| Water | 29.1 | 1.3 | 42.4 | 72.8 |
| Diiodomethane | 46.8 | 4.0 | 0.0 | 50.8 |
| Ethylene glycol | 30.1 | 0.0 | 17.6 | 47.7 |

Unit: mJ/m$^2$ (20° C.)

In Table 4 above, $\gamma_L^d$, $\gamma_L^p$, and $\gamma_L^h$ represent a dispersion force component, a polar component, and a hydrogen bond component, respectively. The respective surface free energies ($\gamma_L^d$, $\gamma_L^p$, $\gamma_L^h$) of each of the three kinds of probe liquids in Table 4 above and the contact angle θ with respect to the probe liquid obtained by the measurement were substituted into the following calculation equation (4) to create three equations for the respective probe liquids. $\gamma_S^d$, $\gamma_S^p$, $\gamma_S^h$ were calculated by solving those ternary simultaneous equations. Then, the sum of $\gamma_S^d$, $\gamma_S^p$, and $\gamma_S^h$ was defined as the surface free energy ($\gamma^{Total}$) It should be noted that the total surface free energy ($\gamma^{Total}$) of the charging member of the present invention is desirably more than 25 mJ/m$^2$ and 35 mJ/m$^2$ or less.

$$\sqrt{\gamma_L^d \times \gamma_S^d} + \sqrt{\gamma_L^p \times \gamma_S^p} + \sqrt{\gamma_L^h \times \gamma_S^h} = \frac{\gamma_L(1+\cos\theta)}{2} \quad \text{Calculation equation (4)}$$

The surface free energy (surface free E) of the charging roller 1 was measured with the contact angle-measuring apparatus.

<Evaluation (3); Calculation of Coefficient of Dynamic Friction>

The coefficient of dynamic friction of the surface layer of the charging roller was measured with an apparatus for measuring a coefficient of dynamic friction illustrated in FIG. 3. In the apparatus for measuring a coefficient of dynamic friction, the charging roller 201 contacts the belt 202 (thickness: 100 μm, width: 30 mm, length: 180 mm, made of a PET (trade name: Lumirror S10 #100, manufactured by Toray Industries, Inc.)) at a predetermined angle θ. The dead weight 203 is connected to one end of the belt and the load meter 204 is connected to the other end thereof. In addition, the recorder 205 is connected to the load meter. When the charging member is rotated in a predetermined direction and at a predetermined speed in a state illustrated in FIG. 3, its coefficient of friction is determined from the following calculation equation (5) where F represents a force [gw] measured with the load meter, and W represents the sum [gw] of the mass of the dead weight and the mass of the belt. It should be noted that the measurement method is in conformity with Euler's belt formula. In the present invention, W is set to 100 [gw], the rotational speed of the charging member is set to 115 rpm, and the measurement is performed under an environment having a temperature of 23° C. and a relative humidity of 50% RH.

$$\text{Coefficient of friction} = (1/\theta)\ln(F/W) \quad \text{Calculation equation (5)}$$

<Evaluation (4); Confirmation of Si—O—Ti Linkage in Surface Layer>

Figure 6A:
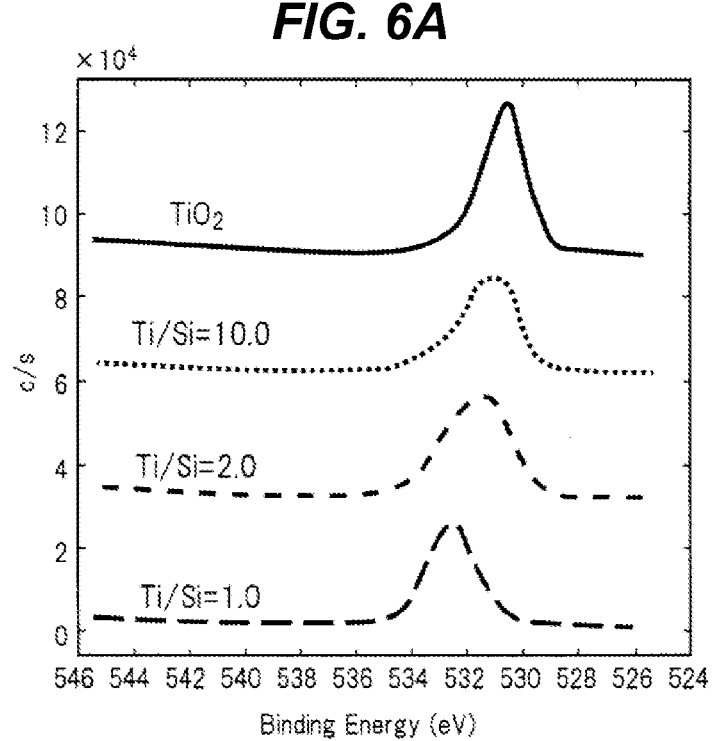
FIG. 6A is a graph showing an example of the result of the ESCA measurement of the polymer compound constituting the surface layer.
Figure 6B:
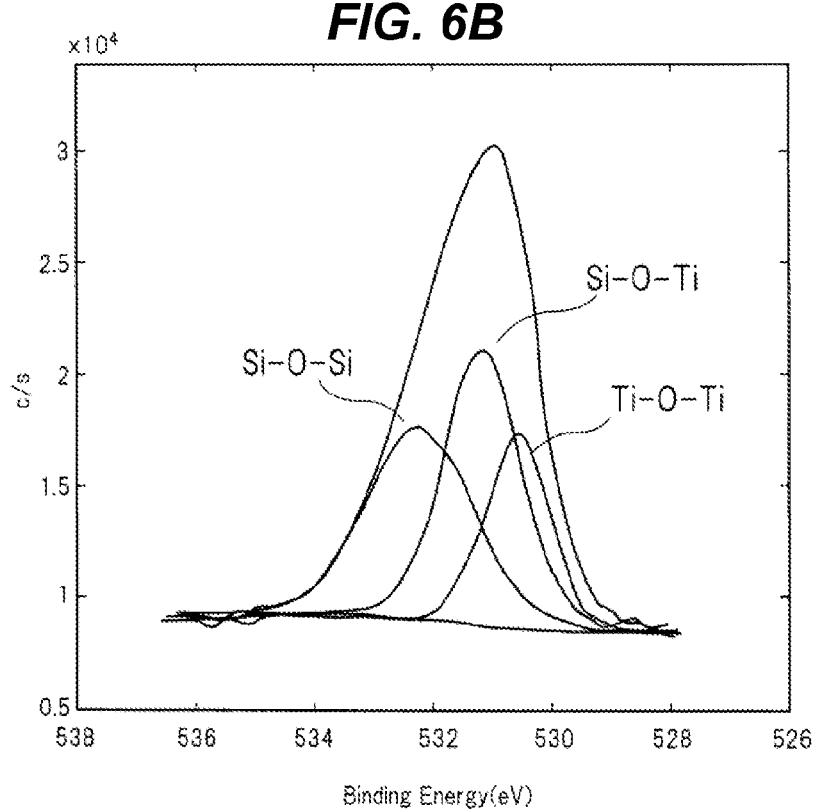
FIG. 6B is a graph showing an example of the result of the ESCA measurement of the polymer compound constituting the surface layer.

The presence of $TiO_{4/2}$ and an Si—O—Ti linkage in the surface layer of the charging roller was confirmed by ESCA (the apparatus used here was available under the trade name "Quantum 2000" from ULVAC-PHI, Inc.). The surface of the charging roller was irradiated with an X-ray and then a bonding mode in the surface layer was evaluated. FIGS. 6A and 6B show detected O1s spectra. It was confirmed from the foregoing that $TiO_{4/2}$ and the Si—O—Ti linkage were present in the surface layer of the charging roller.

<Image Evaluation>

A laser printer (trade name: LaserJet P4700, manufactured by Hewlett-Packard Company) was prepared as an electrophotographic apparatus. The laser printer outputs A4-sized paper in its longitudinal direction. A process cartridge for the laser printer was prepared and then the charging roller 1 was incorporated into the cartridge. The following operation was performed with the process cartridge.

That is, one 2-cm square solid black image and one 2-cm square halftone image were continuously output with the laser printer mounted with the process cartridge into which the charging roller as an object to be evaluated had been incorporated under a high-temperature, high-humidity environment (having a temperature of 30° C. and a humidity of 80% RH). The halftone image is referred to as "first halftone image."

Subsequently, 10,000 electrophotographic images were output. The electrophotographic images output here were each such an electrophotographic image that an alphabetical letter "E" having a size of 4 points was printed on A4-sized paper at a print percentage of 1% (hereinafter referred to as "E-letter image").

In addition, the E-letter images were output according to such an intermittent output mode that every time two E-letter images were continuously output, an electrophotographic photosensitive member was idly rotated for 4 seconds. It should be noted that the output according to the intermittent output mode increases the number of times of the rubbing of the charging member and the photosensitive member as compared with that in the case where the images are continuously output even when the number of images to be output is the same. Accordingly, it can be said that when the surface of the charging member is evaluated for its contamination, the output is an additionally severe evaluation condition. In addition, a process speed at the time of image formation was set to 164 mm/sec.

Subsequently to the output of the 10,000 E-letter images, one 2-cm square solid black image and one 2-cm square halftone image were continuously output. The halftone image is referred to as "second halftone image."

<Evaluation (5)>

The 10,000 electrophotographic images thus obtained were visually observed every 2,000 images and evaluated by criteria shown in Table 5 below.

TABLE 5

| | |
|---|---|
| AA | No charging unevenness due to the fixation of toner or an external additive to the surface of the charging roller can be observed on an output image. |
| A | Nearly no charging unevenness due to unevenness at the time of coating, or the fixation of toner or an external additive to a streak portion, on the surface of the charging roller can be observed on an output image. |
| B | Charging unevenness due to unevenness at the time of coating, or the fixation of toner or an external additive to a streak portion, on the surface of the charging roller can be observed on an output image. |
| C | Charging unevenness due to unevenness at the time of coating, or the fixation of toner or an external additive to a streak portion, on the surface of the charging roller can be observed on an output image, and the degree of the charging unevenness is large. Specifically, white, vertical streak-like charging unevenness can be observed. |

<Evaluation (6)>

10,000 Electrophotographic images were output, and subsequently to the output, a solid image was output. After that, the charging roller 1 was taken out of the process cartridge and then evaluated for the adhering state of an attached matter such as toner or an external additive through visual observation by criteria shown in Table 6 below.

TABLE 6

| | |
|---|---|
| A | No attached matter exists. |
| B | An attached matter is slightly observed. |
| C | An attached matter is observed. |

<Evaluation (7)>

The first halftone image and the second halftone image were each visually observed and evaluated for whether the trace of the 2-cm square solid black image formed immediately before the image was observed by criteria shown in Table 7 below.

TABLE 7

| | |
|---|---|
| AA | No positive ghost can be observed on the halftone image. |
| A | A positive ghost can be observed on the halftone image in an extremely pale fashion. |
| B | The contour of the solid black image can be slightly observed on the halftone image. |
| C | The contour of the solid black image can be slightly observed on the halftone image and the density of a ghost site is somewhat high. |
| D | The contour of the solid black image can be clearly observed on the halftone image and the density of a ghost site is high. |

TABLE 7-continued

| | |
|---|---|
| E | The solid black image can be observed on the halftone image in an extremely clear fashion. |

Example 2

A mixture 2 was obtained in the same manner as in Example 1 except that the amount of the silicone oil to be added to the condensate intermediate 1-2 was changed to 30 g.
Then, Evaluation (1) described in Example 1 was performed except that the mixture 2 was used.
In addition, a charging roller 2 was produced in the same manner as in Example 1 except that the mixture 2 was used, and then the roller was subjected to Evaluations (2) to (7).

Examples 3 to 17

Preparation of Condensate Intermediates 2-2 to 7-2>

Condensate intermediates 2-2 to 7-2 according to the condensate intermediate-II were each prepared in the same manner as in the condensate intermediate 1-2 of Example 1 except that the amount of the condensate intermediate 1-1 and the amount of tetraisopropoxytitanium as the hydrolyzable titanium compound according to the component (C) were changed to amounts shown in Table 8 below.

TABLE 8

| | Condensate intermediate 1-1 (g) | Ti-1 (g) | Ti/Si |
|---|---|---|---|
| Condensate intermediate 2-2 | 21.91 | 154.89 | 12.5 |
| Condensate intermediate 3-2 | 26.56 | 150.24 | 10.0 |
| Condensate intermediate 4-2 | 82.95 | 93.85 | 2.0 |
| Condensate intermediate 5-2 | 112.92 | 63.88 | 1.0 |
| Condensate intermediate 6-2 | 167.33 | 9.47 | 0.1 |
| Condensate intermediate 7-2 | 171.94 | 4.86 | 0.05 |

Preparation of Mixtures 3 to 17

Mixtures 3 to 17 were each prepared in the same manner as in the mixture 1 of Example 1 except that the silicone oil No. 1 was blended in an amount shown in Table 9 below with respect to 100 g of each condensate intermediate according to the condensate intermediate-II shown in Table 9.

TABLE 9

| | Condensate intermediate-II No. | Silicone oil No. | Addition amount (g) |
|---|---|---|---|
| Mixture 3 | 2-2 | 1 | 1 |
| Mixture 4 | 2-2 | 1 | 3 |
| Mixture 5 | 2-2 | 1 | 30 |
| Mixture 6 | 2-2 | 1 | 33 |
| Mixture 7 | 3-2 | 1 | 5 |
| Mixture 8 | 3-2 | 1 | 20 |
| Mixture 9 | 4-2 | 1 | 10 |
| Mixture 10 | 5-2 | 1 | 5 |
| Mixture 11 | 5-2 | 1 | 20 |
| Mixture 12 | 6-2 | 1 | 1 |
| Mixture 13 | 6-2 | 1 | 3 |
| Mixture 14 | 6-2 | 1 | 30 |
| Mixture 15 | 6-2 | 1 | 33 |
| Mixture 16 | 7-2 | 1 | 3 |
| Mixture 17 | 7-2 | 1 | 30 |

Those mixtures 3 to 17 were subjected to Evaluation (1). In addition, charging rollers 3 to 17 were produced in the same manner as in Example 1 except that those mixtures were used, and then the rollers were subjected to Evaluations (2) to (7).

Examples 18 to 30

Preparation of Condensate Intermediates 8-1 to 13-1

Condensate intermediates 8-1 to 13-1 according to the condensate intermediate-I were each prepared in the same manner as in the condensate intermediate 1-1 except that such a blending ratio as shown in Table 10 was adopted. It should be noted that Table 16 shows compounds represented by symbols "EP-1" to "EP-4," "He," and "Ph" in Table 10.

TABLE 10

| Condensate intermedi-ate-I No. | Component (A) | | | | Component (B) | | Water | EtOH |
|---|---|---|---|---|---|---|---|---|
| | EP-1 | EP-2 | EP-3 | EP-4 | He | Ph | | |
| 8-1 | — | 9.68 | — | — | 64.53 | — | 11.66 | 88.79 |
| 9-1 | — | 21.31 | — | — | 53.99 | — | 11.99 | 89.07 |
| 10-1 | — | — | 14.72 | — | 59.16 | — | 10.69 | 89.49 |
| 11-1 | — | — | — | 12.07 | 62.74 | — | 11.34 | 93.17 |
| 12-1 | 13.35 | — | — | — | 16.68 | 53.84 | 11.66 | 80.91 |
| 13-1 | 25.03 | — | — | — | 25.53 | 29.45 | 11.34 | 88.48 |
| 14-1 | 71.02 | — | — | — | — | — | 9.63 | 96.15 |

Preparation of Condensate Intermediates 8-2 to 16-2

Condensate intermediates 8-2 to 16-2 according to the condensate intermediate-II were each prepared in the same manner as in the condensate intermediate 1-2 of Example 1 except that the kind and blending amount of the condensate intermediate-I shown in Table 11 below, and the kind and blending amount of the hydrolyzable titanium compound according to the component (C) were set as shown in Table 11. It should be noted that Table 16 shows compounds represented by symbols "Ti-1" to "Ti-3" in Table 11.

TABLE 11

| Condensate intermedi-ate-II No. | Condensate intermediate-I | | Component (C) | | | Ti/Si |
|---|---|---|---|---|---|---|
| | No. | Blending amount (g) | Ti-1 (g) | Ti-2 (g) | Ti-3 (g) | |
| 8-2 | 8-1 | 80.98 | 95.82 | — | — | 2 |
| 9-2 | 9-1 | 80.20 | 96.60 | — | — | 2 |
| 10-2 | 10-1 | 84.65 | 92.15 | — | — | 2 |
| 11-2 | 11-1 | 83.37 | 93.43 | — | — | 2 |

TABLE 11-continued

| Condensate intermediate-II No. | Condensate intermediate-I No. | Blending amount (g) | Ti-1 (g) | Ti-2 (g) | Ti-3 (g) | Ti/Si |
|---|---|---|---|---|---|---|
| 12-2 | 12-1 | 81.42 | 95.38 | — | — | 2 |
| 13-2 | 13-1 | 83.50 | 93.30 | — | — | 2 |
| 14-2 | 1-1 | 172.36 | — | 4.44 | — | 2 |
| 15-2 | 1-1 | 172.95 | — | — | 3.85 | 2 |
| 16-2 | 14-1 | 90.52 | 86.28 | — | — | 2 |

Component (C) column spans Ti-1, Ti-2, Ti-3, Ti/Si.

Preparation of Mixtures 18 to 25

Mixtures 18 to 25 were each prepared in the same manner as in the mixture 1 of Example 1 except that the silicone oil No. 1 was blended in an amount shown in Table 12 below with respect to 100 g of the condensate intermediate-II shown in Table 12. It should be noted that Table 17 shows the structure of a silicone oil according to the silicone oil No. 1.

TABLE 12

| Mixture No. | Condensate intermediate-II No. | Silicone oil No. | Addition amount (g) |
|---|---|---|---|
| 18 | 8-2 | 1 | 10 |
| 19 | 9-2 | 1 | 10 |
| 20 | 10-2 | 1 | 10 |
| 21 | 11-2 | 1 | 10 |
| 22 | 12-2 | 1 | 10 |
| 23 | 13-2 | 1 | 10 |
| 24 | 14-2 | 1 | 10 |
| 25 | 15-2 | 1 | 10 |

Those mixtures were subjected to Evaluation (1). In addition, charging rollers 18 to 25 were produced in the same manner as in Example 1 except that those mixtures were used, and then the rollers were subjected to Evaluations (2) to (7).

Examples 26 to 29

Mixtures 26 to 29 were each prepared in the same manner as in the mixture 1 of Example 1 except that the kind and addition amount of the silicone oil were changed as shown in Table 13, and then the mixtures were subjected to Evaluation (1).

In addition, charging rollers 26 to 29 were produced in the same manner as in Example 1 except that those mixtures were used, and then the rollers were subjected to Evaluations (2) to (7). It should be noted that Table 17 shows the structures of silicone oils according to silicone oils Nos. 2 to 5.

TABLE 13

| Mixture No. | Silicone oil No. | Addition amount (g) |
|---|---|---|
| 26 | 2 | 10 |
| 27 | 3 | 10 |
| 28 | 4 | 10 |
| 29 | 5 | 10 |

Example 30

A mixture 30 was prepared by adding 10 g of the silicone oil No. 1 to 100 g of the condensate intermediate 16-2 according to the condensate intermediate-II, and then the mixture 30 was subjected to Evaluation (1).

In addition, a charging roller 30 was produced in the same manner as in Example 1 except that the mixture 30 was used, and then the roller was subjected to Evaluations (2) to (7).

Tables 14-1 and 14-2 show the results of Evaluations (1) to (7) of Examples 1 to 30.

TABLE 14-1

| | | Evaluation (1) | | |
|---|---|---|---|---|
| Example | Mixture No. | Presence or absence of ring-opened epoxy | Presence or absence of $T^3$ component | Presence or absence of immobilization of silicone oil |
| 1 | 1 | Present | Present | Present |
| 2 | 2 | Present | Present | Present |
| 3 | 3 | Present | Present | Present |
| 4 | 4 | Present | Present | Present |
| 5 | 5 | Present | Present | Present |
| 6 | 6 | Present | Present | Present |
| 7 | 7 | Present | Present | Present |
| 8 | 8 | Present | Present | Present |
| 9 | 9 | Present | Present | Present |
| 10 | 10 | Present | Present | Present |
| 11 | 11 | Present | Present | Present |
| 12 | 12 | Present | Present | Present |
| 13 | 13 | Present | Present | Present |
| 14 | 14 | Present | Present | Present |
| 15 | 15 | Present | Present | Present |
| 16 | 16 | Present | Present | Present |
| 17 | 17 | Present | Present | Present |
| 18 | 18 | Present | Present | Present |
| 19 | 19 | Present | Present | Present |
| 20 | 20 | Present | Present | Present |
| 21 | 21 | Present | Present | Present |
| 22 | 22 | Present | Present | Present |
| 23 | 23 | Present | Present | Present |
| 24 | 24 | Present | Present | Present |
| 25 | 25 | Present | Present | Present |
| 26 | 26 | Present | Present | Present |
| 27 | 27 | Present | Present | Present |
| 28 | 28 | Present | Present | Present |
| 29 | 29 | Present | Present | Present |
| 30 | 30 | Present | Present | Present |

TABLE 14-2

| Example | Charging roller No. | Evaluation (2) (mJ/m$^2$) | Evaluation (3) | Evaluation (4) Presence or absence of Si—O—Ti linkage | Evaluation (5) Initial stage | 2,000th image | 4,000th image | 6,000th image | 8,000th image | 10,000th image | Evaluation (6) | Evaluation (7) First halftone image | Second halftone image |
|---|---|---|---|---|---|---|---|---|---|---|---|---|---|
| 1  | 1  | 25 | 0.276 | Present | AA | AA | AA | AA | A  | B | B | AA | AA |
| 2  | 2  | 24 | 0.195 | Present | AA | AA | AA | AA | AA | A | A | AA | AA |
| 3  | 3  | 29 | 0.285 | Present | AA | AA | AA | A  | B  | C | C | AA | AA |
| 4  | 4  | 24 | 0.279 | Present | AA | AA | AA | AA | A  | B | B | AA | AA |
| 5  | 5  | 21 | 0.198 | Present | AA | AA | AA | AA | AA | A | A | AA | AA |
| 6  | 6  | 22 | 0.199 | Present | AA | AA | AA | AA | AA | A | A | AA | AA |
| 7  | 7  | 23 | 0.275 | Present | AA | AA | AA | AA | A  | B | B | AA | AA |
| 8  | 8  | 24 | 0.230 | Present | AA | AA | AA | AA | A  | B | A | AA | AA |
| 9  | 9  | 23 | 0.268 | Present | AA | AA | AA | AA | A  | B | A | AA | A  |
| 10 | 10 | 26 | 0.284 | Present | AA | AA | AA | A  | A  | B | B | AA | A  |
| 11 | 11 | 24 | 0.239 | Present | AA | AA | AA | AA | A  | A | A | AA | A  |
| 12 | 12 | 30 | 0.297 | Present | AA | AA | A  | A  | B  | C | C | A  | A  |
| 13 | 13 | 24 | 0.291 | Present | AA | AA | AA | A  | B  | B | B | A  | A  |
| 14 | 14 | 20 | 0.210 | Present | AA | AA | AA | AA | AA | A | A | A  | A  |
| 15 | 15 | 21 | 0.201 | Present | AA | AA | AA | AA | AA | A | A | A  | A  |
| 16 | 16 | 24 | 0.291 | Present | AA | AA | AA | AA | A  | B | B | B  | B  |
| 17 | 17 | 23 | 0.210 | Present | AA | AA | AA | AA | AA | A | A | B  | B  |
| 18 | 18 | 24 | 0.268 | Present | AA | AA | AA | AA | A  | B | A | AA | A  |
| 19 | 19 | 24 | 0.267 | Present | AA | AA | AA | AA | A  | B | A | AA | A  |
| 20 | 20 | 25 | 0.270 | Present | AA | AA | AA | AA | AA | B | A | AA | A  |
| 21 | 21 | 23 | 0.268 | Present | AA | AA | AA | AA | AA | A | A | AA | A  |
| 22 | 22 | 25 | 0.266 | Present | AA | AA | AA | AA | A  | B | A | AA | AA |
| 23 | 23 | 24 | 0.268 | Present | AA | AA | AA | AA | AA | B | A | AA | A  |
| 24 | 24 | 24 | 0.267 | Present | AA | AA | AA | AA | AA | B | A | AA | A  |
| 25 | 25 | 26 | 0.270 | Present | AA | AA | AA | A  | B  | B | A | AA | A  |
| 26 | 26 | 22 | 0.264 | Present | AA | AA | AA | AA | AA | A | A | AA | A  |
| 27 | 27 | 23 | 0.273 | Present | AA | AA | AA | A  | B  | C | C | AA | A  |
| 28 | 28 | 25 | 0.265 | Present | AA | AA | AA | AA | A  | B | A | AA | A  |
| 29 | 29 | 24 | 0.267 | Present | AA | AA | AA | AA | A  | B | A | AA | A  |
| 30 | 30 | 25 | 0.272 | Present | AA | AA | AA | AA | A  | B | A | AA | A  |

Comparative Example 1

A mixture 31 was prepared in the same manner as in the mixture 1 of Example 1 except that a side-chain-amino-modified silicone oil (trade name: FZ-3705, manufactured by Dow Corning Toray Co., Ltd.) represented as a silicone oil No. 6 in Table 17 was used instead of the silicone oil No. 1. The mixture 31 was subjected to Evaluation (1). In addition, a charging roller 31 was produced in the same manner as in Example 1 except that the mixture 31 was used, and then the roller was subjected to Evaluations (2) to (7).

Comparative Example 2

The silicone oil No. 1 used in Example 1 diluted with MEK to 1 mass % was applied to the electro-conductive elastic roller 3 under application conditions identical to those of Example 1. Thus, a charging roller 32 was produced and then subjected to Evaluations (2) to (7).

Table 15-1 shows the result of the evaluation of the mixture 31 according to Comparative Example 1. In addition, Table 15-2 shows the results of the evaluations of the charging rollers 31 and 32.

TABLE 15-1

| Comparative Example | Mixture No. | Evaluation (1) Presence or absence of ring-opened epoxy | Presence or absence of T$^3$ component | Presence or absence of immobilization of silicone oil |
|---|---|---|---|---|
| 1 | 31 | Present | Present | Absent |

TABLE 15-2

| Comparative Example | Charging roller No. | Evaluation (2) (mJ/m$^2$) | Evaluation (3) | Evaluation (4) Presence or absence of Si—O—Ti linkage | Evaluation (5) Initial stage | 2,000th image | 4,000th image | 6,000th image | 8,000th image | 10,000th image | Evaluation (6) | Evaluation (7) First halftone image | Second halftone image |
|---|---|---|---|---|---|---|---|---|---|---|---|---|---|
| 1 | 31 | 22 | 0.255 | Present | AA | AA | A  | C  | C | C | C | AA | C |
| 2 | 32 | 20 | 0.198 | Present | AA | AA | AA | AA | C | C | C | A  | E |

TABLE 16

| Representation | Name | Structure | Manufacturer |
|---|---|---|---|
| EP-1 | 3-Glycidoxypropyltrimethoxysilane | (epoxide)—(CH$_2$)—O—(CH$_2$)$_3$—Si(OMe)$_3$ | Shin-Etsu Chemical Co., Ltd. |
| EP-2 | 4-(1,2-Epoxybutyl)trimethoxysilame | (epoxide)—(CH$_2$)$_2$—Si(OMe)$_3$ | Carbone Scientific |
| EP-3 | 8-Oxiran-2-yloctyltriethoxysilane | (epoxide)—(CH$_2$)$_8$—Si(OEt)$_3$ | SiKÉMIA |
| EP-4 | 1-(3,4-Epoxycyclohexyl)ethyltrimethyoxysilane | epoxycyclohexyl—(CH$_2$)$_2$—Si(OMe)$_3$ | Shin-Etsu Chemical Co., Ltd. |
| He | Hexyltrimethoxysilane | H$_3$C—(CH$_2$)$_5$—Si(OMe)$_3$ | Shin-Etsu Chemical Co., Ltd. |
| Ph | Phenyltriethoxysilane | C$_6$H$_5$—Si(OEt)$_3$ | Shin-Etsu Chemical Co., Ltd. |
| Ti-1 | Titanium tetra-isopropoxide | Ti(OiPr)4 | Kojundo Chemical Laboratory Co., Ltd. |
| Ti-2 | Titanium tetra-n-nonyloxide | Ti(OC9H19)4 | gelest |
| Ti-3 | Titanium tetra-2-ethylhexoxide | Ti(—OCH$_2$CHC$_4$H$_9$(C$_2$H$_5$))$_4$ | gelest |

*Me: methyl group, Et: ethyl group

TABLE 17

| Silicone oil No. | Modification type | Structure | Organic group | Name | Functional group equivalent weight g/mol | Manufacturer |
|---|---|---|---|---|---|---|
| 1 | One-terminal | R—Si(CH$_3$)$_2$—O—[Si(CH$_3$)$_2$—O]$_n$—Si(CH$_3$)$_2$—organic group | —(CH$_2$)$_2$—O—CH$_2$—CH(epoxide)—CH$_2$ | X22-173DX | 4,500 | Shin-Etsu Chemical Co., Ltd. |
| 2 | | | | X22-173BX | 2,490 | Shin-Etsu Chemical Co., Ltd. |
| 3 | Both-terminals | organic group—Si(CH$_3$)$_2$—O—[Si(CH$_3$)$_2$—O]$_n$—Si(CH$_3$)$_2$—organic group | —(CH$_2$)$_2$—O—CH$_2$—CH(epoxide)—CH$_2$ | X22-163 | 200 | Shin-Etsu Chemical Co., Ltd. |
| 4 | | | | X22-163C | 2,700 | Shin-Etsu Chemical Co., Ltd. |
| 5 | | | —(CH$_2$)$_2$—epoxycyclohexyl | X22-169B | 1,700 | Shin-Etsu Chemical Co., Ltd. |
| 6 | Side-chain | CH$_3$—Si(CH$_3$)$_2$—O—[Si(CH$_3$)$_2$—O]$_m$—[Si(CH$_3$)(organic group)—O]$_n$—Si(CH$_3$)$_3$ | —C$_2$H$_4$NHC$_2$H$_4$NH$_2$ | FZ-3705 | 4,000 | Dow Corning Toray Co., Ltd. |

Preferred embodiments of the present invention will now be described in detail in accordance with the accompanying drawings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-099828, filed Apr. 27, 2011, which is hereby incorporated by reference herein in its entirety.

What is claimed is:

1. A charging member for an electrophotographic apparatus, comprising:
an electro-conductive support;
an electro-conductive elastic layer; and
a surface layer,
wherein:
the surface layer comprises a polymer compound having an Si—O—Ti linkage in a molecular structure thereof; and
the polymer compound has constitutional units represented by the following formulae (1), (2), and (3):

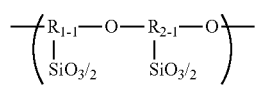

Formula (1)

Formula (2)

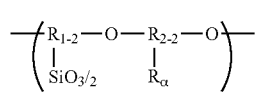

Formula (3)

in the formulae (1) and (3), $R_{1-1}$, $R_{2-1}$, $R_{1-2}$, and $R_{2-2}$ each independently represent any one of structures represented by the following formulae (4) to (7), and in the formula (3), $R\alpha$ represents any one of structures represented by the following formulae (8) to (12):

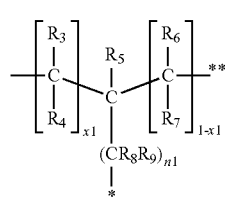

Formula (4)

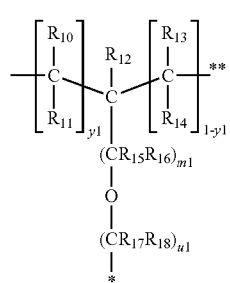

Formula (5)

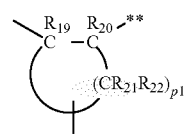

Formula (6)

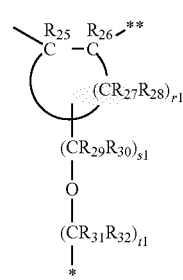

Formula (7)

in the formulae (4) to (7):

$R_3$ to $R_7$, $R_{10}$ to $R_{14}$, $R_{19}$, $R_{20}$, $R_{25}$, and $R_{26}$ each independently represent a hydrogen atom, an alkyl group having 1 or more and 4 or less carbon atoms, a hydroxyl group, a carboxyl group, or an amino group;

$R_8$, $R_9$, $R_{15}$ to $R_{18}$, $R_{23}$, $R_{24}$, and $R_{29}$ to $R_{32}$ each independently represent a hydrogen atom, or an alkyl group having 1 or more and 4 or less carbon atoms, and $R_{21}$, $R_{22}$, $R_{27}$, and $R_{28}$ each independently represent a hydrogen atom, an alkoxy group having 1 or more and 4 or less carbon atoms, or an alkyl group having 1 or more and 4 or less carbon atoms;

n1, m1, q1, s1, t1, and u1 each independently represent an integer of 1 or more and 8 or less, and p1 and r1 each independently represent an integer of 4 or more and 12 or less;

x1 and y1 each independently represent 0 or 1;

a symbol "*" represents a site to be bonded to a silicon atom in the formula (1), a site to be bonded to a silicon atom in the formula (3), or a site to be bonded to any one of the structures represented by the following formulae (8) to (12) as $R\alpha$ in the formula (3); and a symbol "**" represents a site to be bonded to an oxygen atom in each of the formula (1) and the formula (3):

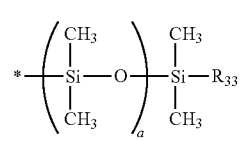

Formula (8)

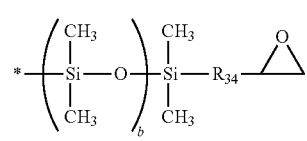

Formula (9)

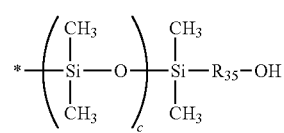

Formula (10)

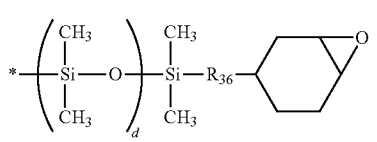

Formula (11)

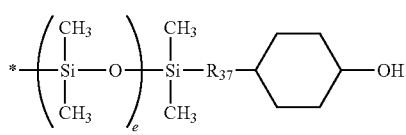

Formula (12)

in the formulae (8) to (12):

$R_{33}$ to $R_{37}$ each independently represent an alkylene group having 1 or more and 6 or less carbon atoms, or a hydrocarbon group partially substituted with an ether group;

a to e each independently represent an integer of 1 or more and 1,350 or less; and a symbol "*" represents a site to be bonded to the symbol "*" in any one of the structures represented by the formulae (4) to (7) as $R_{2\text{-}2}$ in the formula (3).

2. The charging member according to claim 1, wherein $R_{1\text{-}1}$, $R_{2\text{-}1}$, $R_{1\text{-}2}$, and $R_{2\text{-}2}$ in the formulae (1) and (3) each independently represent any one of structures represented by the following formulae (13) to (16):

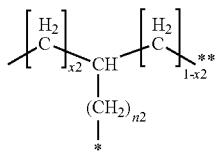

Formula (13)

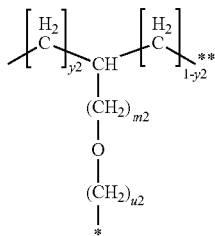

Formula (14)

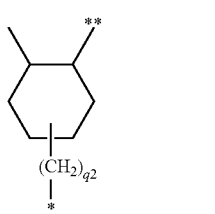

Formula (15)

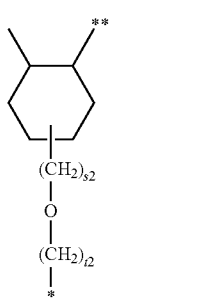

Formula (16)

in the formulae (13) to (16):

n2, m2, q2, s2, t2, and u2 each independently represent an integer of 1 or more and 8 or less;

x2 and y2 each independently represent 0 or 1; and definition of each of symbols and "*" and "**" is identical to the definition in each of the formulae (4) to (7).

3. The charging member according to claim 1, which has a ratio (Ti/Si) of the number of titanium atoms to the number of silicon atoms in the polymer compound of 0.1 or more and 12.5 or less.

4. The charging member according to claim 1, wherein the polymer compound comprises a crosslinked product of a hydrolyzable compound having a structure represented by a formula (17), a hydrolyzable compound represented by a formula (18), and at least one of epoxy-modified silicone oils represented by formulae (23) to (25):

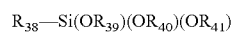

Formula (17)

Formula (18)

in the formula (17), $R_{38}$ represents any one of structures represented by formulae (19) to (22), the structure having an epoxy group, and $R_{39}$ to $R_{41}$ each independently represent a hydrocarbon group having 1 or more and 4 or less carbon atoms, and in the formula (18), $R_{42}$ to $R_{45}$ each independently represent a hydrocarbon group having 1 or more and 18 or less carbon atoms:

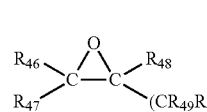

Formula (19)

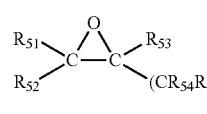

Formula (20)

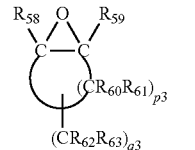

Formula (21)

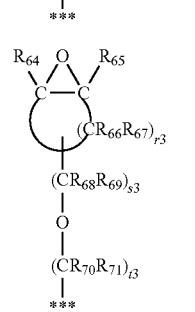

Formula (22)

in the formulae (19) to (22):

$R_{46}$ to $R_{48}$, $R_{51}$ to $R_{53}$, $R_{58}$, $R_{59}$, $R_{64}$, and $R_{65}$ each independently represent a hydrogen atom, an alkyl group having 1 or more and 4 or less carbon atoms, a hydroxyl group, a carboxyl group, or an amino group, and $R_{49}$, $R_{50}$, $R_{54}$ to $R_{57}$, $R_{62}$, $R_{63}$, and $R_{68}$ to $R_{71}$ each independently represent a hydrogen atom, or an alkyl group having 1 or more and 4 or less carbon atoms;

$R_{60}$, $R_{61}$, $R_{66}$, and $R_{67}$ each independently represent a hydrogen atom, an alkoxy group having 1 or more and 4 or less carbon atoms, or an alkyl group having 1 or more and 4 or less carbon atoms;

n3, m3, q3, s3, t3, and u3 each independently represent an integer of 1 or more and 8 or less;

p3 and r3 each independently represent an integer of 4 or more and 12 or less; and a symbol "***" represents a site to be bonded to a silicon atom in the formula (17):

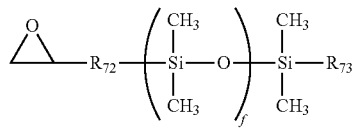
Formula (23)

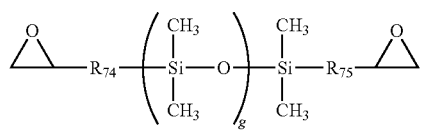
Formula (24)

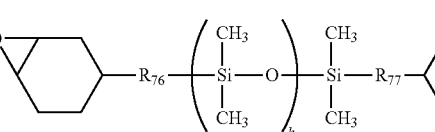
Formula (25)

in the formulae (23) to (25), $R_{72}$ to $R_{77}$ each independently represent an alkyl group having 1 or more and 6 or less carbon atoms, or a hydrocarbon group partially substituted with an ether group, and f, g, and h each independently represent an integer of 1 or more and 1,350 or less.

5. A method of producing the charging member according to claim 4, the method comprising the steps of:

forming, on an outer periphery of the electro-conductive elastic layer, a coating film of a paint containing a hydrolyzed condensate synthesized from the hydrolyzable compounds represented by the formulae (17) and (18), and at least one of the epoxy-modified silicone oils represented by the formulae (23) to (25); and forming the surface layer by cleaving and polymerizing the epoxy group of the $R_{38}$ in the hydrolyzed condensate and an epoxy group in the epoxy-modified silicone oil to crosslink the hydrolyzed condensate, and crosslinking the silicone oil with the condensate.

6. The charging member according to claim 1, wherein the polymer compound comprises a crosslinked product of a hydrolyzable compound represented by a formula (17), a hydrolyzable compound represented by a formula (18), at least one of epoxy-modified silicone oils represented by formulae (23) to (25), and a hydrolyzable compound represented by a formula (26):

$R_{38}$—Si(O$R_{39}$)(O$R_{40}$)(O$R_{41}$)   Formula (17)

Ti—(O$R_{42}$)(O$R_{43}$)(O$R_{44}$)(O$R_{45}$)   Formula (18)

in the formula (17), $R_{38}$ represents any one of structures represented by formulae (19) to (22), the structure having an epoxy group, and $R_{39}$ to $R_{41}$ each independently represent a hydrocarbon group having 1 or more and 4 or less carbon atoms, and in the formula (18), $R_{42}$ to $R_{45}$ each independently represent a hydrocarbon group having 1 or more and 18 or less carbon atoms:

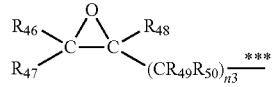
Formula (19)

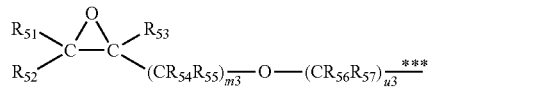
Formula (20)

Formula (21)

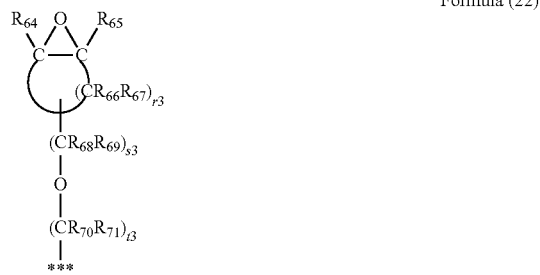
Formula (22)

in the formulae (19) to (22):

$R_{46}$ to $R_{48}$, $R_{51}$ to $R_{53}$, $R_{58}$, $R_{59}$, $R_{64}$, and $R_{65}$ each independently represent a hydrogen atom, an alkyl group having 1 or more and 4 or less carbon atoms, a hydroxyl group, a carboxyl group, or an amino group, and $R_{49}$, $R_{50}$, $R_{54}$ to $R_{57}$, $R_{62}$, $R_{63}$, and $R_{68}$ to $R_{71}$ each independently represent a hydrogen atom, or an alkyl group having 1 or more and 4 or less carbon atoms;

$R_{60}$, $R_{61}$, $R_{66}$, and $R_{67}$ each independently represent a hydrogen atom, an alkoxy group having 1 or more and 4 or less carbon atoms, or an alkyl group having 1 or more and 4 or less carbon atoms;

n3, m3, q3, s3, t3, and u3 each independently represent an integer of 1 or more and 8 or less;

p3 and r3 each independently represent an integer of 4 or more and 12 or less; and a symbol "***" represents a site to be bonded to a silicon atom in the formula (17):

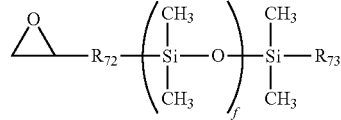
Formula (23)

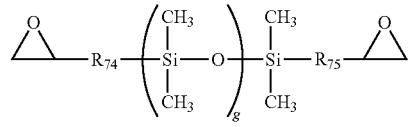
Formula (24)

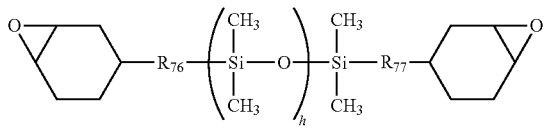

Formula (25)

in the formulae (23) to (25), $R_{72}$ to $R_{77}$ each independently represent an alkyl group having 1 or more and 6 or less carbon atoms, or a hydrocarbon group partially substituted with an ether group, and f, g, and h each independently represent an integer of 1 or more and 1,350 or less;

$$R_{78}\text{—}Si(OR_{79})(OR_{80})(OR_{81})$$ Formula (26)

in the formula (26), $R_{78}$ represents an alkyl group or an aryl group, and $R_{79}$ to $R_{81}$ each independently represent a hydrocarbon group.

7. A method of producing the charging member according to claim 6, the method comprising the steps of:

forming, on an outer periphery of the electro-conductive elastic layer, a coating film of a paint containing a hydrolyzed condensate synthesized from the hydrolyzable compounds represented by the formulae (17), (18), and (26), and at least one of the epoxy-modified silicone oils represented by the formulae (23) to (25); and forming the surface layer by cleaving and polymerizing the epoxy group of the $R_{38}$ in the hydrolyzed condensate and an epoxy group in the epoxy-modified silicone oil to crosslink the hydrolyzed condensate, and crosslinking the silicone oil with the condensate.

8. A process cartridge, comprising:
an electrophotographic photosensitive member; and
the charging member according to claim 1 placed to contact the electrophotographic photosensitive member, wherein
the process cartridge is detachably mountable to a main body of an electrophotographic apparatus.

9. An electrophotographic apparatus, comprising:
an electrophotographic photosensitive member; and
the charging member according to claim 1 placed to contact the electrophotographic photosensitive member.

* * * * *